US011225896B1

(12) United States Patent
Nakagawa

(10) Patent No.: US 11,225,896 B1
(45) Date of Patent: Jan. 18, 2022

(54) DEGRADATION DIAGNOSIS DEVICE FOR EXHAUST GAS CONTROL CATALYST

(71) Applicant: TOYOTA JIDOSHA KABUSHIKI KAISHA, Toyota (JP)

(72) Inventor: Norihisa Nakagawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/345,443

(22) Filed: Jun. 11, 2021

(51) Int. Cl.
  *F01N 11/00* (2006.01)
  *F01N 3/00* (2006.01)
  *F01N 3/035* (2006.01)

(52) U.S. Cl.
  CPC ............ *F01N 11/007* (2013.01); *F01N 3/035* (2013.01); *F01N 11/002* (2013.01); *F01N 2430/06* (2013.01); *F01N 2550/04* (2013.01); *F01N 2560/025* (2013.01); *F01N 2560/06* (2013.01); *F01N 2900/0601* (2013.01); *F01N 2900/1402* (2013.01); *F01N 2900/1602* (2013.01); *F01N 2900/1624* (2013.01)

(58) Field of Classification Search
  CPC ...... F01N 11/007; F01N 3/035; F01N 11/002; F01N 2430/06; F01N 2550/04; F01N 2560/025; F01N 2560/06; F01N 2900/0601; F01N 2900/1402; F01N 2900/1602; F01N 2900/1624
  See application file for complete search history.

(56) References Cited

U.S. PATENT DOCUMENTS

| | | | |
|---|---|---|---|
| 5,847,271 A * | 12/1998 | Poublon | F01N 11/007 73/114.73 |
| 5,945,597 A * | 8/1999 | Poublon | F01N 11/007 73/114.75 |
| 10,125,708 B2 * | 11/2018 | Okabe | F02D 41/1441 |
| 2008/0154476 A1 * | 6/2008 | Takubo | F02D 41/1408 701/101 |
| 2012/0031170 A1 * | 2/2012 | Matsumoto | F02D 41/1454 73/30.01 |
| 2015/0089927 A1 * | 4/2015 | Kubo | F01N 3/101 60/277 |
| 2017/0037802 A1 * | 2/2017 | Okabe | F02D 41/1455 |
| 2018/0010539 A1 * | 1/2018 | Inoshita | F02D 41/1445 |

FOREIGN PATENT DOCUMENTS

| | | |
|---|---|---|
| JP | 2005-299587 A | 10/2005 |
| JP | 2010-180717 A | 8/2010 |

* cited by examiner

*Primary Examiner* — Matthew T Largi
(74) *Attorney, Agent, or Firm* — Finnegan, Henderson, Farabow, Garrett & Dunner, LLP

(57) ABSTRACT

A degradation diagnosis device includes a downstream air-fuel ratio sensor and a control device. The control device is configured to perform a rich process and a lean process alternately and repeatedly in a degradation diagnosis process for diagnosing degradation of the exhaust gas control catalyst. The control device is configured to, in the degradation diagnosis process, determine that the exhaust gas control catalyst has been degraded when the lean process is executed and the frequency with which an output air-fuel ratio of the downstream air-fuel ratio sensor is equal to the lean air-fuel ratio is equal to or more than a predetermined frequency.

12 Claims, 10 Drawing Sheets

DEGRADATION DIAGNOSIS DEVICE FOR EXHAUST GAS CONTROL CATALYST

CROSS-REFERENCE TO RELATED APPLICATION

This application claims priority to Japanese Patent Application No. 2020-110493 filed on Jun. 26, 2020, incorporated herein by reference in its entirety.

BACKGROUND

1. Technical Field

The present disclosure relates to a degradation diagnosis device for an exhaust gas control catalyst.

2. Description of Related Art

Providing an exhaust gas control catalyst that can store oxygen in an exhaust passage of an internal combustion engine is known (e.g. Japanese Unexamined Patent Application Publication No. 2010-180717 (JP 2010-180717 A) and Japanese Unexamined Patent Application Publication No. 2005-299587 (JP 2005-299587 A)). The exhaust gas control catalyst that can store oxygen stores oxygen in an exhaust gas when the air-fuel ratio of the exhaust gas which flows in is leaner (hereinafter referred to as a "lean air-fuel ratio") than the stoichiometric air-fuel ratio, and releases the stored oxygen when the air-fuel ratio of the exhaust gas which flows in is richer (hereinafter referred to as a "rich air-fuel ratio") than the stoichiometric air-fuel ratio.

When such an exhaust gas control catalyst is degraded because of sintering etc., for example, the oxygen storage capability of the exhaust gas control catalyst is lowered. Thus, the device described in JP 2010-180717 A performs active air-fuel ratio control in which a rich process, in which the air-fuel ratio of the exhaust gas which flows into the exhaust gas control catalyst is controlled to a rich air-fuel ratio, and a lean process, in which the air-fuel ratio of the exhaust gas which flows into the exhaust gas control catalyst is controlled to a lean air-fuel ratio, are performed alternately and repeatedly, in order to diagnose degradation of the exhaust gas control catalyst. In the active air-fuel ratio control described in JP 2010-180717 A, the rich process is executed until the output air-fuel ratio of a downstream air-fuel ratio sensor provided downstream of the exhaust gas control catalyst is equal to a rich air-fuel ratio, and the lean process is executed until the output air-fuel ratio of the downstream air-fuel ratio sensor is equal to a lean air-fuel ratio. In the device described in JP 2010-180717 A, moreover, the oxygen storage amount during the lean process and the oxygen release amount during the rich process are measured a plurality of times, the average value of the measured values and fluctuations in the measured values are calculated, a maximum storable oxygen amount is estimated based on the average value and the fluctuations, and degradation of the exhaust gas control catalyst is diagnosed based on the maximum storable oxygen amount.

SUMMARY

In the active air-fuel ratio control performed for degradation diagnosis in JP 2010-180717 A, the lean process is executed until the output air-fuel ratio of the downstream air-fuel ratio sensor is equal to a lean air-fuel ratio. When the output air-fuel ratio of the downstream air-fuel ratio sensor is equal to a lean air-fuel ratio in this manner, it is indicated that oxygen is flowing out of the exhaust gas control catalyst, that is, nitrogen oxides (NOx) is flowing out of the exhaust gas control catalyst. Thus, there is a possibility that NOx flows out of the exhaust gas control catalyst when the device described in JP 2010-180717 A diagnoses degradation of the exhaust gas control catalyst.

The present disclosure provides a degradation diagnosis device for an exhaust gas control catalyst, the degradation diagnosis device being capable of suppressing NOx from flowing out of the exhaust gas control catalyst when diagnosing degradation of the exhaust gas control catalyst.

An aspect of the present disclosure provides a degradation diagnosis device for an exhaust gas control catalyst, the degradation diagnosis device being configured to diagnose degradation of the exhaust gas control catalyst that is provided in an exhaust passage of an internal combustion engine and that is configured to store oxygen. The degradation diagnosis device for the exhaust gas control catalyst includes a downstream air-fuel ratio sensor and a control device. The downstream air-fuel ratio sensor is configured to detect an air-fuel ratio of an exhaust gas that has flowed out of the exhaust gas control catalyst. The control device is configured to control an air-fuel ratio of an exhaust gas that flows into the exhaust gas control catalyst and diagnose degradation of the exhaust gas control catalyst based on an output of the downstream air-fuel ratio sensor. The control device is configured to, in a degradation diagnosis process to diagnose degradation of the exhaust gas control catalyst, perform a rich process and a lean process alternately and repeatedly, the rich process being a process in which the air-fuel ratio of the exhaust gas that flows into the exhaust gas control catalyst is controlled to a rich air-fuel ratio that is richer than a stoichiometric air-fuel ratio, and the lean process being a process in which the air-fuel ratio of the exhaust gas that flows into the exhaust gas control catalyst is controlled to a lean air-fuel ratio that is leaner than the stoichiometric air-fuel ratio. The control device is configured to, in the degradation diagnosis process, switch from the rich process to the lean process when an amount of oxygen released from the exhaust gas control catalyst since the rich process is started is equal to a first oxygen amount, and switch from the lean process to the rich process when an amount of oxygen stored in the exhaust gas control catalyst since the lean process is started is equal to a second oxygen amount that is less than the first oxygen amount. The control device is configured to, in the degradation diagnosis process, determine that the exhaust gas control catalyst has been degraded when the lean process is executed and a frequency with which an output air-fuel ratio of the downstream air-fuel ratio sensor is equal to the lean air-fuel ratio is equal to or more than a predetermined frequency.

In the degradation diagnosis device according to the aspect of the present disclosure, the control device may be configured to switch from the rich process to the lean process when the output air-fuel ratio of the downstream air-fuel ratio sensor is equal to the rich air-fuel ratio, even before the amount of oxygen released from the exhaust gas control catalyst since the rich process is started is equal to the first oxygen amount. In the degradation diagnosis device according to the aspect of the present disclosure, the control device may be configured to switch from the lean process to the rich process when the output air-fuel ratio of the downstream air-fuel ratio sensor is equal to the lean air-fuel ratio, even before the amount of oxygen stored in the exhaust gas control catalyst since the lean process is started is equal to the second oxygen amount. In the degradation diagnosis device according to the aspect of the present disclosure, the control device may be configured to execute the rich process first when starting the degradation diagnosis process. In the degradation diagnosis device according to the aspect of the present disclosure, the control device may be configured to execute the rich process last when ending the degradation diagnosis process.

In the degradation diagnosis device according to the aspect of the present disclosure, the control device may be configured to control the air-fuel ratio of an exhaust gas discharged from an engine body to be switched between the rich air-fuel ratio and the lean air-fuel ratio alternately in normal air-fuel ratio control that is different from the degradation diagnosis process. The air-fuel ratio of the exhaust gas discharged from the engine body during the rich process may be higher in richness degree than that at a time when the air-fuel ratio of the exhaust gas discharged from the engine body is set to the rich air-fuel ratio in the normal air-fuel ratio control. In the degradation diagnosis device according to the aspect of the present disclosure, the control device may be configured to control an air-fuel ratio of an exhaust gas discharged from an engine body to be switched between the rich air-fuel ratio and the lean air-fuel ratio alternately in normal air-fuel ratio control which is different from the degradation diagnosis process. The air-fuel ratio of the exhaust gas discharged from the engine body during the lean process may be higher in leanness degree than that at a time when the air-fuel ratio of the exhaust gas discharged from the engine body is set to the lean air-fuel ratio in the normal air-fuel ratio control. In the degradation diagnosis device according to the aspect of the present disclosure, the first oxygen amount may be set so as to become larger as a temperature of the exhaust gas control catalyst becomes higher. In the degradation diagnosis device according to the aspect of the present disclosure, the second oxygen amount may be set so as to become larger as a temperature of the exhaust gas control catalyst becomes higher. In the degradation diagnosis device according to the aspect of the present disclosure, the exhaust gas control catalyst may function as a particulate filter that traps particulate matter in the exhaust gas.

The degradation diagnosis device according to the aspect of the present disclosure may further include a first air-fuel ratio sensor and a second air-fuel ratio sensor. A first catalyst and a second catalyst may be provided in an exhaust passage of the internal combustion engine. The second catalyst may serve as the exhaust gas control catalyst and be provided downstream of the first catalyst. The first air-fuel ratio sensor may be disposed upstream of the first catalyst. The second air-fuel ratio sensor may be provided between the first catalyst and the second catalyst. A third air-fuel ratio sensor may be disposed downstream of the second catalyst. The third air-fuel ratio sensor may serve as the downstream air-fuel ratio. In the degradation diagnosis device according to the aspect of the present disclosure, the control device may be configured to execute a second degradation diagnosis process when diagnosing degradation of the first catalyst. The second degradation diagnosis process may be different from the degradation diagnosis process. The control device may be configured to perform the rich process and the lean process alternately and repeatedly also in the second degradation diagnosis process. The control device may be configured to, in the second degradation diagnosis process, start the lean process by switching an air-fuel ratio of an exhaust gas that flows into the first catalyst from the rich air-fuel ratio to the lean air-fuel ratio when an output air-fuel ratio of the second air-fuel ratio sensor is varied to the rich air-fuel ratio. The control device may be configured to, in the second degradation diagnosis process, start the rich process by switching the air-fuel ratio of the exhaust gas that flows into the first catalyst from the lean air-fuel ratio to the rich air-fuel ratio when the output air-fuel ratio of the second air-fuel ratio sensor is varied to the lean air-fuel ratio. The control device may be configured to, in the second degradation diagnosis process, estimate an amount of oxygen stored in the first catalyst in one lean process or an amount of oxygen released from the first catalyst in one rich process. The control device may be configured to, in the second degradation diagnosis process, determine based on the estimated amount of oxygen whether the first catalyst has been degraded.

With the degradation diagnosis device according to the aspect of the present disclosure, there is provided a degradation diagnosis device for an exhaust gas control catalyst, the degradation diagnosis device being capable of suppressing NOx from flowing out of the exhaust gas control catalyst when diagnosing degradation of the exhaust gas control catalyst.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment will be described below with reference to the drawings. In the following description, like constituent elements are given identical reference signs.

Overall Internal Combustion Engine

Figure 1:
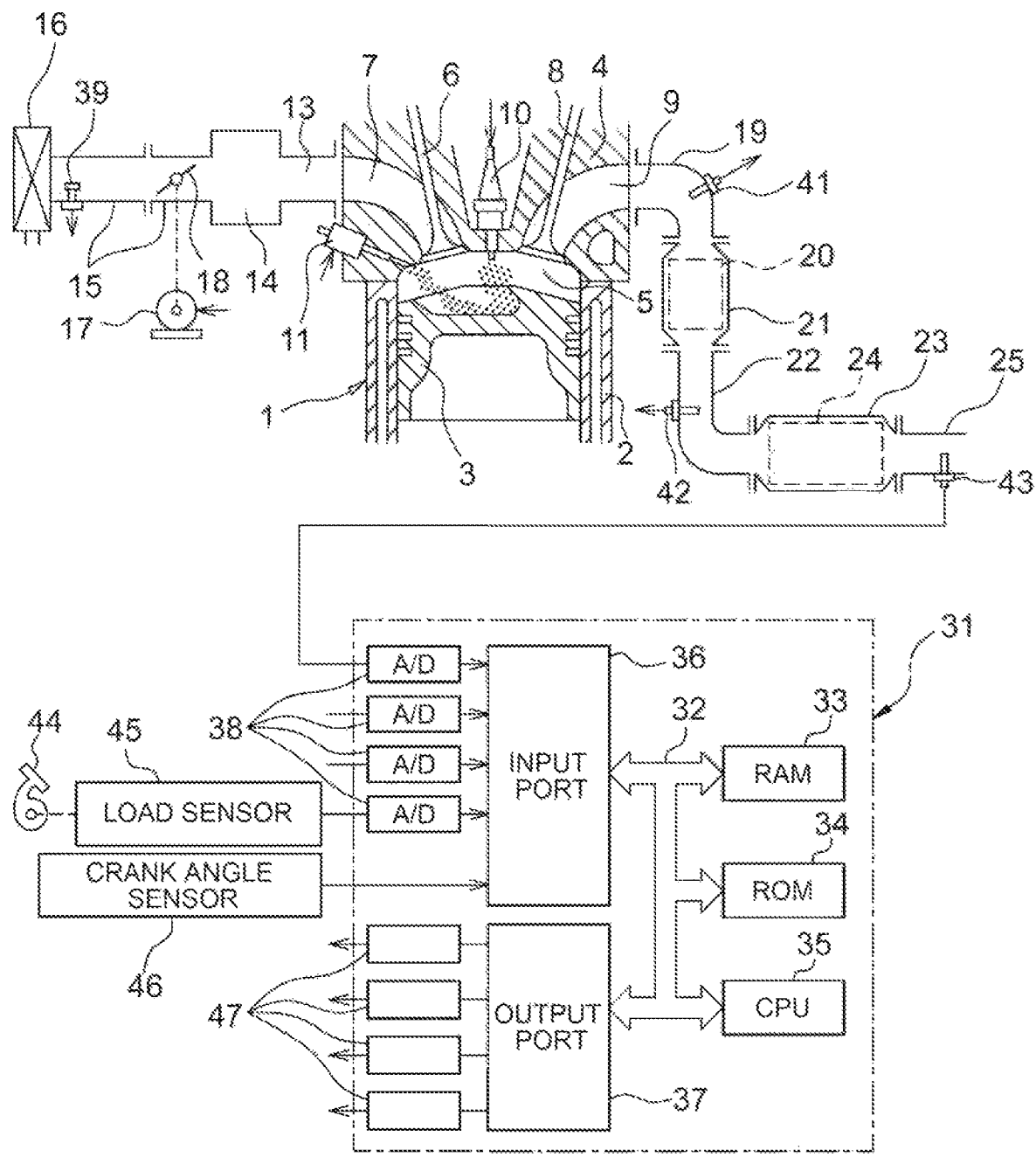
FIG. 1 schematically illustrates an internal combustion engine in which a degradation diagnosis device according to an embodiment is used.

FIG. 1 schematically illustrates an internal combustion engine in which a degradation diagnosis device according to an embodiment is used. With reference to FIG. 1, sign 1 denotes an engine body, 2 denotes a cylinder block, 3 denotes a piston that reciprocates in the cylinder block 2, 4 denotes a cylinder head fixed on top of the cylinder block 2, 5 denotes a combustion chamber formed between the piston 3 and the cylinder head 4, 6 denotes an intake valve, 7 denotes an intake port, 8 denotes an exhaust valve, and 9 denotes an exhaust port. The intake valve 6 opens and closes the intake port 7. The exhaust valve 8 opens and closes the exhaust port 9. In the present embodiment, a plurality of cylinders are formed in the cylinder block 2, and one piston 3 reciprocates in each of the cylinders.

As illustrated in FIG. 1, an ignition plug 10 is disposed at the center of the inner wall surface of the cylinder head 4, and a fuel injection valve 11 is disposed at a peripheral portion of the inner wall surface of the cylinder head 4. The ignition plug 10 is configured to generate a spark in accordance with an ignition signal. The fuel injection valve 11 injects a predetermined amount of fuel into the combustion chamber 5 in accordance with an injection signal. The fuel injection valve 11 may be disposed so as to inject fuel into the intake port 7. In the present embodiment, gasoline with a stoichiometric air-fuel ratio of 14.6 is used as the fuel. However, the internal combustion engine may use a fuel other than gasoline or a blended fuel of gasoline.

The intake port 7 of each of the cylinders is coupled to a surge tank 14 via a corresponding intake branch pipe 13. The surge tank 14 is coupled to an air cleaner 16 via an intake pipe 15. The intake port 7, the intake branch pipe 13, the surge tank 14, and the intake pipe 15 form an intake passage. A throttle valve 18 that is driven by a throttle valve drive actuator 17 is disposed in the intake pipe 15. The throttle valve 18 can be turned by the throttle valve drive actuator 17 to change the opening area of the intake passage.

The exhaust port 9 of each of the cylinders is coupled to an exhaust manifold 19. The exhaust manifold 19 has a plurality of branch portions each coupled to the exhaust port 9 and an aggregated portion in which the branch portions are aggregated. The aggregated portion of the exhaust manifold 19 is coupled to an upstream casing 21 that incorporates an upstream exhaust gas control catalyst (hereinafter referred to as an "upstream catalyst") 20. The upstream casing 21 is coupled to a downstream casing 23 that incorporates a downstream exhaust gas control catalyst (hereinafter referred to as a "downstream catalyst") 24 via a first exhaust pipe 22. The downstream casing 23 is coupled to a second exhaust pipe 25. The second exhaust pipe 25 communicates with atmosphere via a muffler (not illustrated), for example. The exhaust port 9, the exhaust manifold 19, the upstream casing 21, the first exhaust pipe 22, the downstream casing 23, and the second exhaust pipe 25 form an exhaust passage.

An electronic control unit (ECU) 31 is constituted of a digital computer, and includes a random access memory (RAM) 33, a read only memory (ROM) 34, a central processing unit (CPU) (microprocessor) 35, an input port 36, and an output port 37, which are connected to each other via a bidirectional bus 32. An air flow meter 39 for detecting the flow rate of air that flows in the intake pipe 15 is disposed in the intake pipe 15. An output of the air flow meter 39 is input to the input port 36 via a corresponding analog/digital (AD) converter 38.

A first air-fuel ratio sensor 41 that detects the air-fuel ratio of an exhaust gas (i.e. an exhaust gas that flows into the upstream catalyst 20) that flows in the exhaust manifold 19 is disposed in the aggregated portion of the exhaust manifold 19. In addition, a second air-fuel ratio sensor 42 that detects the air-fuel ratio of an exhaust gas (i.e. an exhaust gas that flows out of the upstream catalyst 20 and that flows into the downstream catalyst 24) that flows in the first exhaust pipe 22 is disposed in the first exhaust pipe 22. Further, a third air-fuel ratio sensor 43 that detects the air-fuel ratio of an exhaust gas (i.e. an exhaust gas that flows out of the downstream catalyst 24) that flows in the second exhaust pipe 25 is disposed in the second exhaust pipe 25. Outputs of the air-fuel ratio sensors 41, 42, and 43 are also input to the input port 36 via corresponding AD converters 38.

Figure 2:
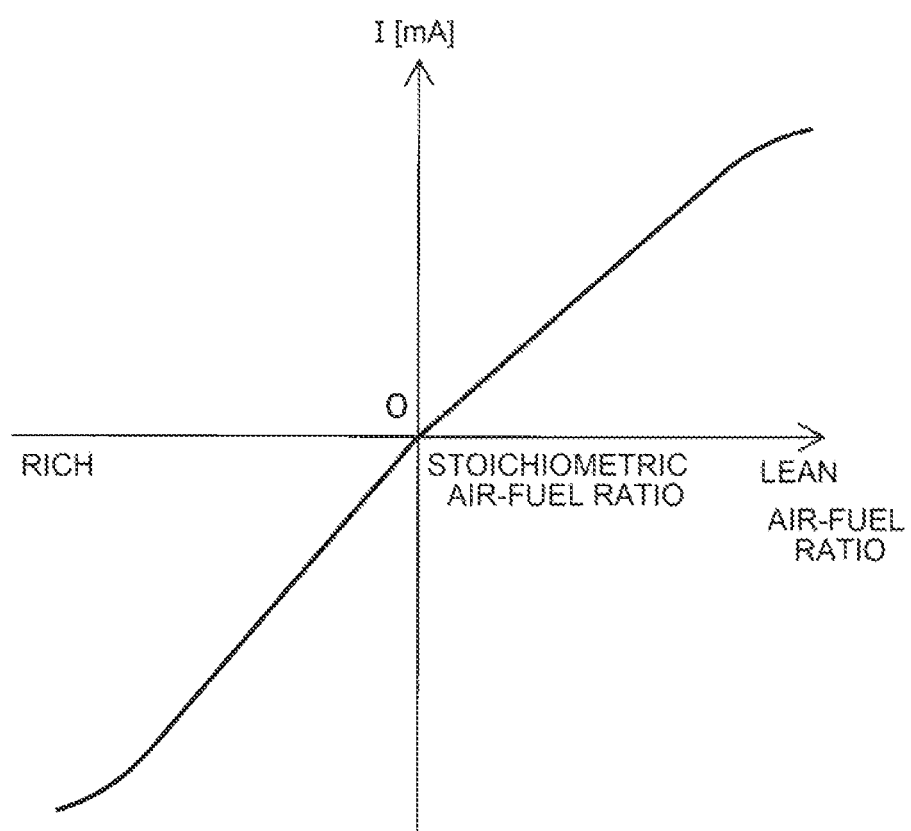
FIG. 2 illustrates the relationship between the air-fuel ratio of an exhaust gas around an air-fuel ratio sensor and an output current of the air-fuel ratio sensor.

In the present embodiment, air-fuel ratio sensors of a limiting current type are used as the air-fuel ratio sensors 41, 42, and 43. Thus, the air-fuel ratio sensors 41, 42, and 43 are configured such that an output current from the air-fuel ratio sensors 41, 42, and 43 becomes larger as the air-fuel ratio of an exhaust gas around the air-fuel ratio sensors 41, 42, and 43 becomes higher (i.e. becomes leaner) as indicated in FIG. 2. In particular, the air-fuel ratio sensors 41, 42, and 43 according to the present embodiment are configured such that the output current is varied linearly with respect to the air-fuel ratio of an exhaust gas around the air-fuel ratio sensors 41, 42, and 43. While air-fuel ratio sensors of a limiting current type are used as the air-fuel ratio sensors 41, 42, and 43 in the present embodiment, air-fuel ratio sensors other than air-fuel ratio sensors of a limiting current type may also be used if outputs of the sensors are varied in accordance with the air-fuel ratio of an exhaust gas. Examples of such air-fuel ratio sensors include an oxygen sensor etc. with an output that is varied abruptly in the vicinity of the stoichiometric air-fuel ratio with no voltage applied between electrodes that constitute the sensor.

A load sensor 45 that generates an output voltage that is proportional to the amount of depression of an accelerator pedal 44 is connected to the accelerator pedal 44. The output voltage of the load sensor 45 is input to the input port 36 via a corresponding AD converter 38. A crank angle sensor 46 generates an output pulse each time a crankshaft is rotated by 15 degrees, for example. The output pulse is input to the input port 36. The CPU 35 calculates an engine rotational speed from the output pulse of the crank angle sensor 46. On the other hand, the output port 37 is connected to the ignition plug 10, the fuel injection valve 11, and the throttle valve drive actuator 17 via corresponding drive circuits 47. The ECU 31 controls the air-fuel ratio of an exhaust gas discharged from the engine body 1 by controlling the amount of opening of the throttle valve 18 and the amount of fuel injected from the fuel injection valve 11. In addition, the ECU 31 diagnoses degradation of the downstream catalyst 24 based on an output from the third air-fuel ratio sensor 43 as discussed later. Thus, the ECU 31 functions as a control device that controls the air-fuel ratio of an exhaust gas discharged from the engine body 1 and that diagnoses degradation of the downstream catalyst 24 based on an output of the third air-fuel ratio sensor 43.

The exhaust gas control catalysts (upstream catalyst 20 and downstream catalyst 24) are each a three-way catalyst that has an oxygen storage capability. Specifically, the exhaust gas control catalysts 20 and 24 are each a three-way catalyst in which a catalytic noble metal (e.g. platinum (Pt)) that has catalysis and a substance (e.g. ceria ($CeO_2$)) that has an oxygen storage capability are carried by a carrier formed from a ceramic material. The three-way catalyst has a function of reducing unburned hydrocarbon (HC), carbon monoxide (CO), and NOx at the same time when the air-fuel ratio of an exhaust gas that flows into the three-way catalyst is maintained at the stoichiometric air-fuel ratio. When a certain amount of oxygen is stored in the exhaust gas control catalysts 20 and 24, in addition, unburned HC, CO, and NOx are reduced at the same time even if the air-fuel ratio of an exhaust gas that flows into the exhaust gas control catalysts 20 and 24 slightly deviates from the stoichiometric air-fuel ratio to the rich side or the lean side.

That is, when the exhaust gas control catalysts 20 and 24 can store oxygen, that is, when the amount of oxygen stored in the exhaust gas control catalysts 20 and 24 is less than the maximum storable oxygen amount, excessive oxygen contained in an exhaust gas that flows into the exhaust gas control catalysts 20 and 24 is stored in the exhaust gas control catalysts 20 and 24 when the air-fuel ratio of the exhaust gas is slightly leaner than the stoichiometric air-fuel ratio. Therefore, the air-fuel ratio on the surfaces of the exhaust gas control catalysts 20 and 24 is maintained at the stoichiometric air-fuel ratio. As a result, unburned HC, CO, and NOx are reduced at the same time on the surfaces of the exhaust gas control catalysts 20 and 24, and the air-fuel ratio of an exhaust gas that flows out of the exhaust gas control catalysts 20 and 24 at this time is the stoichiometric air-fuel ratio.

When the exhaust gas control catalysts 20 and 24 can release oxygen, that is, when the amount of oxygen stored in the exhaust gas control catalysts 20 and 24 is more than zero, on the other hand, oxygen that is short for reducing unburned HC and CO contained in an exhaust gas that flows into the exhaust gas control catalysts 20 and 24 is released from the exhaust gas control catalysts 20 and 24 when the air-fuel ratio of the exhaust gas is slightly richer than the stoichiometric air-fuel ratio. Therefore, also in this case, the air-fuel ratio on the surfaces of the exhaust gas control catalysts 20 and 24 is maintained at the stoichiometric air-fuel ratio. As a result, unburned HC. CO, and NOx are reduced at the same time on the surfaces of the exhaust gas control catalysts 20 and 24, and the air-fuel ratio of an exhaust gas that flows out of the exhaust gas control catalysts 20 and 24 at this time is the stoichiometric air-fuel ratio.

In this manner, when a certain amount of oxygen is stored in the exhaust gas control catalysts 20 and 24, unburned HC, CO, and NOx are reduced at the same time even if the air-fuel ratio of an exhaust gas that flows into the exhaust gas control catalysts 20 and 24 slightly deviates from the stoichiometric air-fuel ratio to the rich side or the lean side, and the air-fuel ratio of an exhaust gas that flows out of the exhaust gas control catalysts 20 and 24 is equal to the stoichiometric air-fuel ratio.

In the present embodiment, the downstream catalyst 24 is constituted as a particulate filter for trapping particulate matter. Thus, the downstream catalyst 24 is formed such that an exhaust gas flows through a porous partition wall of the filter. The downstream catalyst 24 may not be constituted as a particulate filter.

Normal Air-Fuel Ratio Control

Next, an overview of the normal air-fuel ratio control performed normally by the control device for the internal combustion engine according to the present embodiment will be described. In the normal air-fuel ratio control according to the present embodiment, feedback control in which the amount of fuel injected from the fuel injection valve 11 is controlled such that the output air-fuel ratio of the first air-fuel ratio sensor 41 is equal to the target air-fuel ratio is performed. The term "output air-fuel ratio" means an air-fuel ratio corresponding to an output value of an air-fuel ratio sensor.

Figure 3:
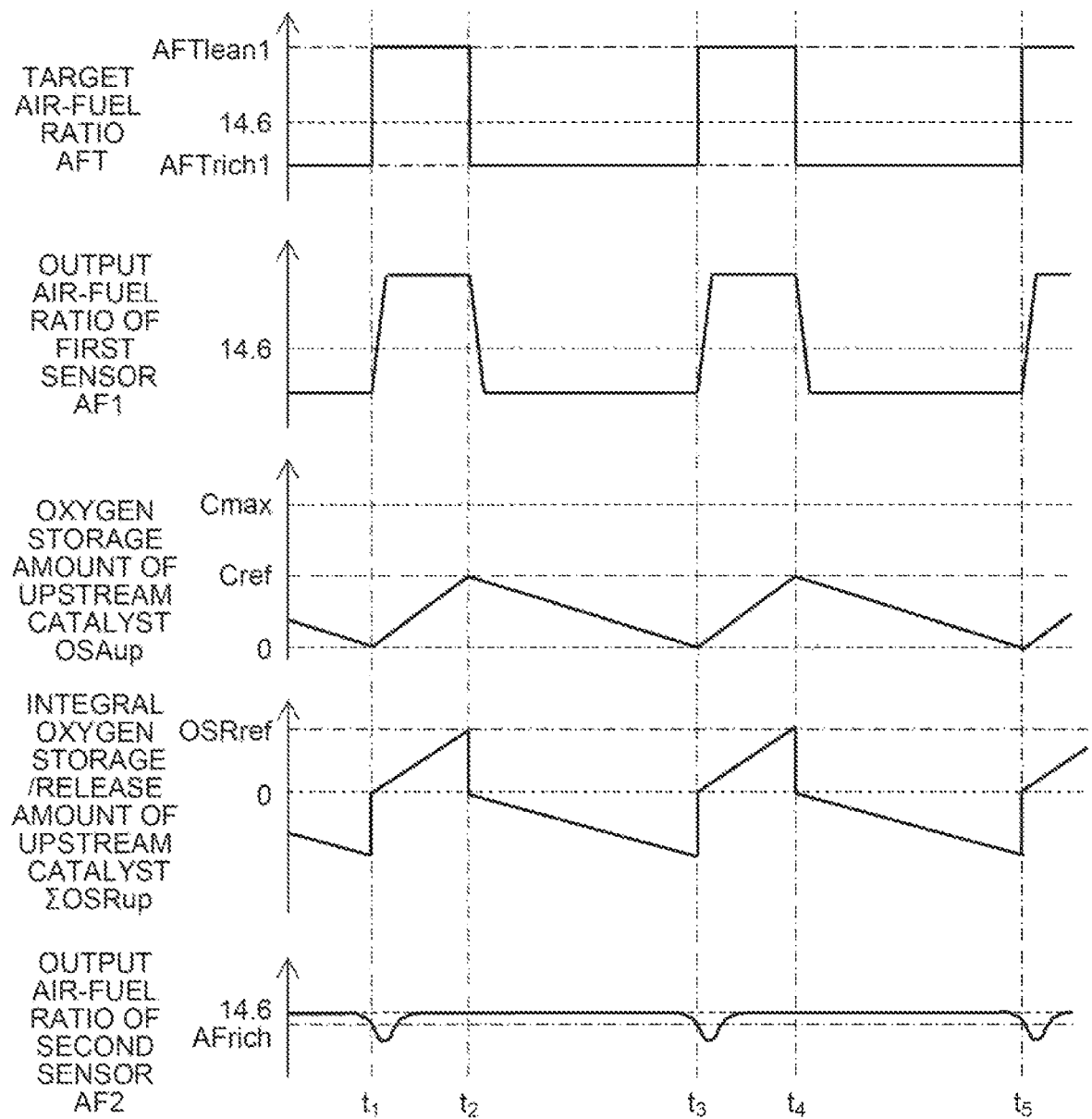
FIG. 3 is a time chart for a target air-fuel ratio etc. for a case where normal air-fuel ratio control is performed.

In the normal air-fuel ratio control according to the present embodiment, the target air-fuel ratio is set based on the output air-fuel ratio of the second air-fuel ratio sensor 42 etc. A process of setting the target air-fuel ratio in the normal air-fuel ratio control will be described below with reference to FIG. 3. FIG. 3 is a time chart of a target air-fuel ratio AFT, an output air-fuel ratio AF1 of the first air-fuel ratio sensor 41, an oxygen storage amount OSAup of the upstream catalyst 20, an integral oxygen storage/release amount ΣOSRup of the upstream catalyst 20, and an output air-fuel ratio AF2 of the second air-fuel ratio sensor 42 for a case where the normal air-fuel ratio control according to the present embodiment is performed.

When the output air-fuel ratio AF2 of the second air-fuel ratio sensor 42 is equal to an air-fuel ratio (hereinafter referred to as a "rich air-fuel ratio") that is richer than the stoichiometric air-fuel ratio (at times $t_1$, $t_3$, and $t_5$ in the drawing), the oxygen storage amount OSAup of the upstream catalyst 20 is substantially zero. In the present embodiment, a lean process in which the target air-fuel ratio AFT is controlled to an air-fuel ratio (hereinafter referred to as a "lean air-fuel ratio") that is leaner than the stoichiometric air-fuel ratio is started at such times. As a result, the air-fuel ratio of an exhaust gas discharged from the engine body 1 is equal to a lean air-fuel ratio. In the lean process of the normal air-fuel ratio control according to the present embodiment, in particular, the target air-fuel ratio AFT is set to a first lean setting air-fuel ratio AFTlean1 which is an air-fuel ratio (e.g. about 14.65 to 16) determined in advance that is more or less leaner than the stoichiometric air-fuel ratio. In the present embodiment, it is determined that the output air-fuel ratio of an air-fuel ratio sensor has become a rich air-fuel ratio when the output air-fuel ratio of the air-fuel ratio sensor has become equal to or less than a rich determination air-fuel ratio AFrich (e.g. 14.55) which is slightly richer than the stoichiometric air-fuel ratio.

Integration of an oxygen storage/release amount OSRup of the upstream catalyst 20 is started at the same time as the lean process is started at times $t_1$, $t_3$, and $t_5$. The oxygen storage/release amount OSRup of the upstream catalyst 20 means the amount of oxygen stored in the upstream catalyst 20 from an exhaust gas that flows into the upstream catalyst 20, or the amount of oxygen released from the upstream catalyst 20 into such an exhaust gas. In other words, the oxygen storage/release amount OSRup of the upstream catalyst 20 means the amount of oxygen that is excessive, or the amount of oxygen that is short (the amount of excessive unburned HC, CO, etc. (hereinafter referred to as an "unburned gas")), when it is attempted to make the air-fuel ratio of an exhaust gas that flows into the upstream catalyst 20 equal to the stoichiometric air-fuel ratio. In particular, oxygen in an exhaust gas that flows into the upstream catalyst 20 is excessive during the lean process, and the excessive oxygen is stored in the upstream catalyst 20. Thus, an integral value (hereinafter referred to as an "integral oxygen storage/release amount") ΣOSRup of the oxygen storage/release amount is considered as an estimated value of the oxygen storage amount of the upstream catalyst 20. When the lean process is started, the oxygen storage amount OSAup of the upstream catalyst 20 is gradually increased, and therefore the integral oxygen storage/release amount ΣOSRup is also gradually increased.

The oxygen storage/release amount OSRup of the upstream catalyst 20 is calculated based on the output air-fuel ratio AF1 of the first air-fuel ratio sensor 41, and an estimated value of the amount of air taken into the combustion chamber 5, which is calculated based on an output of the air flow meter 39 etc., or the amount of fuel supplied from the fuel injection valve 11, etc. Specifically, the oxygen storage/release amount OSRup of the upstream catalyst 20 is calculated using the following formula (1), for example.

$$OSRup = 0.23 \times Qi \times (AF1 - AFR) \quad (1)$$

In the formula, 0.23 represents the concentration of oxygen in the air, Qi represents the fuel injection amount, AF1 represents the output air-fuel ratio of the first air-fuel ratio sensor 41, and AFR represents the stoichiometric air-fuel ratio.

In the present embodiment, when the thus calculated integral oxygen storage/release amount ΣOSRup of the upstream catalyst 20 becomes equal to or more than a switching reference value OSRref determined in advance (at times $t_2$ and $t_4$), a rich process in which the target air-fuel ratio AFT is set to a rich air-fuel ratio is started. As a result, the air-fuel ratio of an exhaust gas discharged from the engine body 1 is equal to a rich air-fuel ratio. In the rich process of the normal air-fuel ratio control according to the present embodiment, in particular, the target air-fuel ratio AFT is set to a rich setting air-fuel ratio AFTrich which is an air-fuel ratio (e.g. about 14 to 14.55) determined in advance that is more or less richer than the stoichiometric air-fuel ratio. The switching reference value OSRref is set to an amount (e.g. half; corresponding to Cref in FIG. 3) that is less than a maximum storable oxygen amount Cmax at the time when the upstream catalyst 20 is brand-new. Thus, in the present embodiment, the rich process is started before the oxygen storage amount of the upstream catalyst 20 reaches the vicinity of the maximum storable oxygen amount Cmax. Therefore, the rich process is started before oxygen or NOx flows out of the upstream catalyst 20.

After that, when the output air-fuel ratio AF2 of the second air-fuel ratio sensor 42 becomes equal to or less than the rich determination air-fuel ratio again, the rich process is started again, and similar operations are repeatedly performed thereafter. In this manner, in the normal air-fuel ratio control according to the present embodiment, the rich process and the lean process are performed alternately and repeatedly. In other words, in the normal air-fuel ratio control according to the present embodiment, the air-fuel ratio of an exhaust gas discharged from the engine body 1 is alternately switched between a rich air-fuel ratio and a lean air-fuel ratio.

With the normal air-fuel ratio control discussed above performed, no NOx basically flows out of the upstream catalyst 20, although unburned HC, CO, etc. flow out of the upstream catalyst 20 temporarily at times $t_1$, $t_3$, and $t_5$. The unburned HC and CO which have flowed out of the upstream catalyst 20 are reduced in the downstream catalyst 24. The oxygen storage amount of the downstream catalyst 24 is increased to the maximum storable oxygen amount Cmax during fuel cut control in which the internal combustion engine is caused to operate with no fuel supplied thereto, and thereafter decreased when the unburned HC and CO have flowed out of the upstream catalyst 20 to be removed.

It is not always necessary to perform the control discussed above as the normal air-fuel ratio control which is performed when the fuel cut control, fuel increase control in which the fuel supply amount is temporarily increased, etc. are not performed. Various kinds of control can be performed as the normal air-fuel ratio control as long as the time-average air-fuel ratio of an exhaust gas that flows into the downstream catalyst 24 is controlled to the stoichiometric air-fuel ratio or a rich air-fuel ratio.

Diagnosis of Degradation of Upstream Catalyst

The exhaust gas control catalyst 20 is gradually degraded through repeated use. Specifically, when the temperature of the exhaust gas control catalysts 20 and 24 becomes high, the catalysis of the exhaust gas control catalysts 20 and 24 is lowered with the catalytic noble metal, which is carried by the carrier, sintered. When the exhaust gas control catalysts 20 and 24 are degraded in this manner, it is necessary to change the mode of control in the normal air-fuel ratio control, or replace the exhaust gas control catalysts 20 and 24. Therefore, the degradation diagnosis device according to the present embodiment diagnoses degradation of the exhaust gas control catalysts 20 and 24. First, diagnosis of degradation of the upstream catalyst 20 (second degradation diagnosis process) will be described with reference to FIG. 4.

Figure 4:
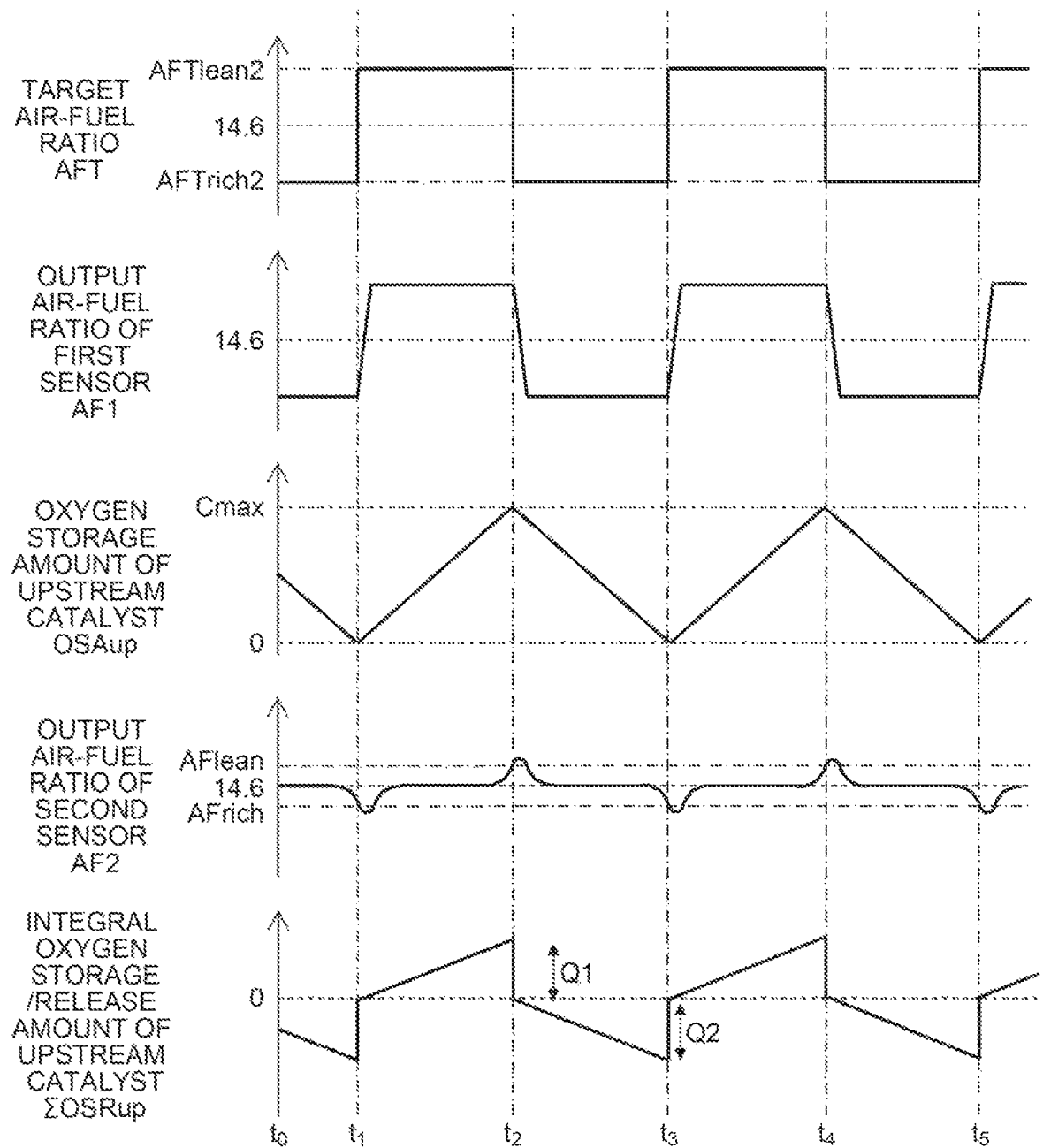
FIG. 4 is a time chart for the target air-fuel ratio etc. for a case where degradation of an upstream catalyst is diagnosed.

FIG. 4 is a time chart, which is similar to FIG. 3, of the target air-fuel ratio AFT etc. for a case where a degradation diagnosis process for the upstream catalyst 20 is performed. In the example indicated in FIG. 4, diagnosis of degradation of the upstream catalyst 20 is started at time $t_0$.

In the diagnosis of degradation of the upstream catalyst 20, the lean process is started when the output air-fuel ratio AF2 of the second air-fuel ratio sensor 42 is equal to a rich air-fuel ratio (at times $t_1$, $t_3$, and $t_5$ in FIG. 4), and the target air-fuel ratio AFT is switched to a second lean setting air-fuel ratio AFTlean2. The second lean setting air-fuel ratio AFTlean2 is set to an air-fuel ratio that is higher (higher in the leanness degree) than the first lean setting air-fuel ratio AFTlean1. As a result, the air-fuel ratio of an exhaust gas discharged from the engine body 1 to flow into the upstream catalyst 20 is equal to a lean air-fuel ratio, and the oxygen storage amount OSAup of the upstream catalyst 20 is gradually increased.

In the diagnosis of degradation of the upstream catalyst 20, in addition, the rich process is started when the output air-fuel ratio AF2 of the second air-fuel ratio sensor 42 is equal to a lean air-fuel ratio (at times $t_2$ and $t_4$ in FIG. 4), and the target air-fuel ratio AFT is switched to a second rich setting air-fuel ratio AFTrich2. The second rich setting air-fuel ratio AFTrich2 is set to an air-fuel ratio that is lower (higher in the richness degree) than a first rich setting air-fuel ratio AFTrich1. As a result, the air-fuel ratio of an exhaust gas discharged from the engine body 1 to flow into the upstream catalyst 20 is equal to a rich air-fuel ratio, and the oxygen storage amount OSAup of the upstream catalyst 20 is gradually decreased.

In the diagnosis of degradation of the upstream catalyst 20, the target air-fuel ratio AFT is alternately set to a rich air-fuel ratio and a lean air-fuel ratio in this manner. The output air-fuel ratio AF2 of the second air-fuel ratio sensor 42 being equal to a rich air-fuel ratio means that the oxygen storage amount OSAup of the upstream catalyst 20 is substantially zero. On the other hand, the output air-fuel ratio AF2 of the second air-fuel ratio sensor 42 being equal to a lean air-fuel ratio means that the oxygen storage amount OSAup of the upstream catalyst 20 has reached the maximum storable oxygen amount Cmax. Thus, the integral oxygen storage/release amount ΣOSRup (Q1 in FIG. 4) during a period when the target air-fuel ratio AFT is set to a lean air-fuel ratio and the integral oxygen storage/release amount ΣOSRup (Q2 in FIG. 4) during a period when the target air-fuel ratio AFT is set to a rich air-fuel ratio correspond to the maximum storable oxygen amount Cmax of the upstream catalyst 20.

When an exhaust gas control catalyst is degraded, the maximum storable oxygen amount Cmax is decreased accordingly. Thus, degradation of the exhaust gas control catalyst can be diagnosed based on the maximum storable oxygen amount Cmax. In the diagnosis of degradation of the upstream catalyst 20 according to the present embodiment, it is determined that the upstream catalyst 20 has been degraded when the integral oxygen storage/release amount ΣOSRup (Q1 in FIG. 4) during one lean process and/or the integral oxygen storage/release amount ΣOSRup (Q2 in FIG. 4) during one rich process are/is less than a lower limit amount (e.g. about 30% of the maximum storable oxygen amount Cmax at the time when the upstream catalyst 20 is brand-new) determined in advance.

Figure 5:
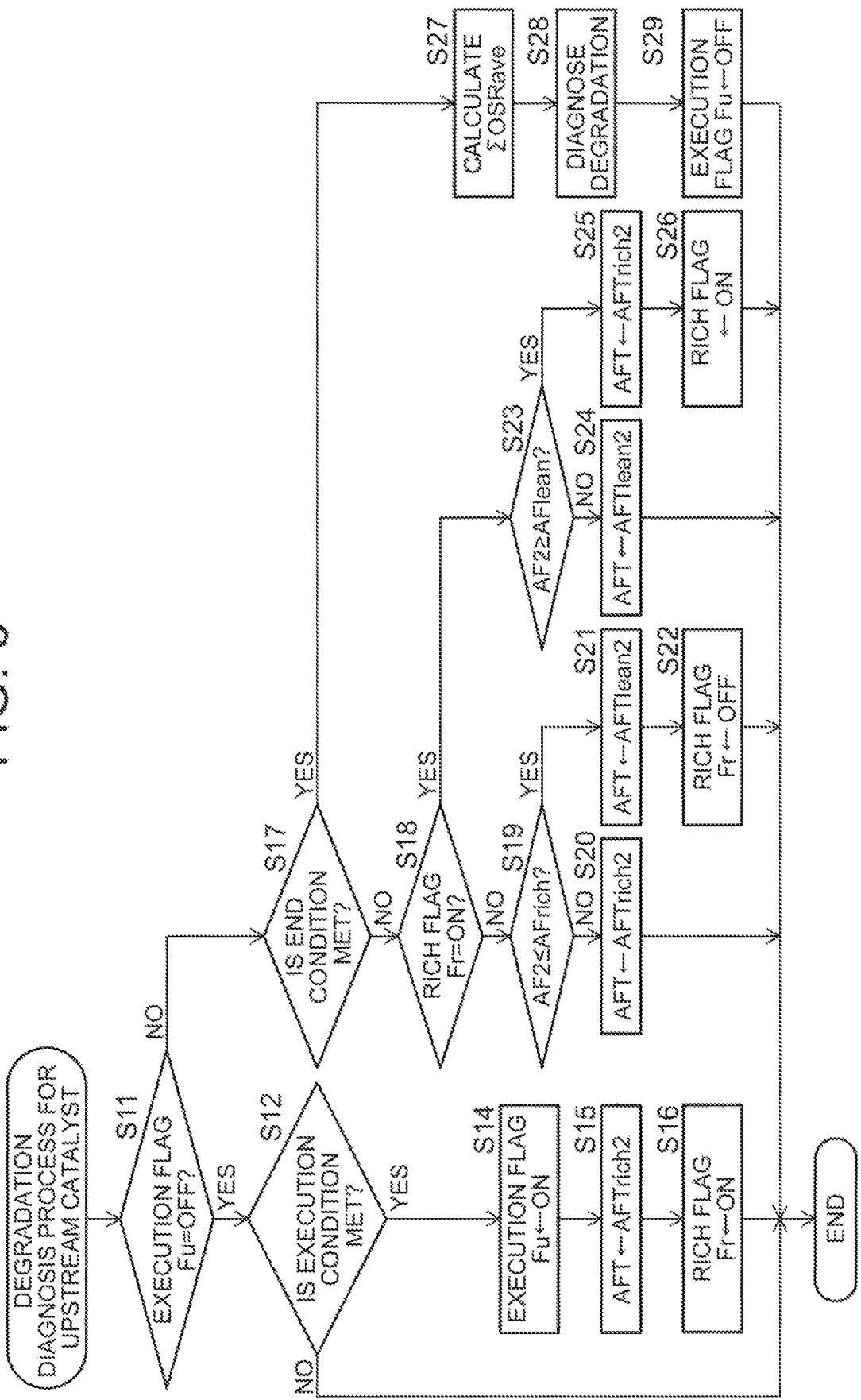
FIG. 5 is a flowchart illustrating a control routine of a degradation diagnosis process for the upstream catalyst.

FIG. 5 is a flowchart illustrating a control routine of the degradation diagnosis process for the upstream catalyst 20. The illustrated control routine is performed by the CPU 35 of the ECU 31 at intervals of a certain time.

First, as illustrated in FIG. 5, it is determined in step S11 whether an execution flag Fu for a degradation diagnosis process for the upstream catalyst 20 is OFF. The execution flag Fu is a flag set to ON when the degradation diagnosis process for the upstream catalyst 20 is executed and set to OFF otherwise. When it is determined in step S11 that the execution flag Fu is set to OFF, the control routine proceeds to step S12.

In step S12, it is determined whether an execution condition for the degradation diagnosis process for the upstream catalyst 20 is met. The execution condition for the degradation diagnosis process for the upstream catalyst 20 is met when the elapsed time or the travel distance since the preceding degradation diagnosis process is equal to or more than a certain value and warm-up of the internal combustion engine has been completed, for example. When it is determined in step S12 that the execution condition for the degradation diagnosis process for the upstream catalyst 20 is not met, the control routine is ended. Thus, the degradation diagnosis process for the upstream catalyst 20 is not executed, and hence the normal air-fuel ratio control indicated in FIG. 3 is executed, for example.

When it is determined in step S12 that the execution condition for the degradation diagnosis process for the upstream catalyst 20 is met, on the other hand, the control routine proceeds to steps S14 to S16. In steps S14 to S16, the execution flag Fu for the degradation diagnosis process for the upstream catalyst 20 is set to ON, a rich process is started by setting the target air-fuel ratio AFT to the second rich setting air-fuel ratio AFTrich2, and a rich flag Fr is set to ON. The rich flag Fr is a flag set to ON when the target air-fuel ratio is set to a rich air-fuel ratio and set to OFF otherwise.

When the execution flag Fu is set to ON in step S14, the next control routine proceeds from step S11 to step S17. In step S17, it is determined whether an end condition for the degradation diagnosis process for the upstream catalyst 20 is met. The end condition for the degradation diagnosis process for the upstream catalyst 20 is met when the rich process and the lean process are executed a plurality of times, for example. When it is determined in step S17 that the end condition is not met, the control routine proceeds to step S18.

In step S18, it is determined whether the rich flag Fr is set to ON. When it is determined in step S18 that the rich flag Fr is set to ON, the control routine proceeds to step S19. In step S19, it is determined whether the output air-fuel ratio AF2 of the second air-fuel ratio sensor 42 is equal to or less than the rich determination air-fuel ratio AFrich, that is, whether the output air-fuel ratio AF2 of the second air-fuel ratio sensor 42 is a rich air-fuel ratio. When it is determined that the output air-fuel ratio AF2 of the second air-fuel ratio sensor 42 is more than the rich determination air-fuel ratio AFrich, the target air-fuel ratio AFT is kept set to the second rich setting air-fuel ratio AFTrich2 in step S20, and hence the rich process is continued.

After that, when the oxygen storage amount of the upstream catalyst 20 is decreased and the air-fuel ratio of an exhaust gas that flows out of the upstream catalyst 20 is lowered, it is determined in step S19 that the output air-fuel ratio AF2 of the second air-fuel ratio sensor 42 is equal to or less than the rich determination air-fuel ratio AFrich. In this case, the control routine proceeds to step S21, and the target air-fuel ratio AFT is switched to the second lean setting air-fuel ratio AFTlean2, and the lean process is started. Then, in step S22, the rich flag Fr is set to OFF.

When the rich flag Fr is set to OFF, the next control routine proceeds from step S118 to step S23. In step S23, it is determined whether the output air-fuel ratio AF2 of the second air-fuel ratio sensor 42 is equal to or more than a lean determination air-fuel ratio AFlean, that is, whether the output air-fuel ratio AF2 of the second air-fuel ratio sensor 42 is a lean air-fuel ratio. When it is determined that the output air-fuel ratio AF2 of the second air-fuel ratio sensor 42 is less than the lean determination air-fuel ratio AFlean, the target air-fuel ratio AFT is kept set to the second lean setting air-fuel ratio AFTlean2 in step S24, and hence the lean process is continued.

After that, when the oxygen storage amount of the upstream catalyst 20 is increased and the air-fuel ratio of an exhaust gas that flows out of the upstream catalyst 20 is raised, it is determined in step S23 that the output air-fuel ratio AF2 of the second air-fuel ratio sensor 42 is equal to or more than the lean determination air-fuel ratio AFlean. In this case, the control routine proceeds to step S25, and the target air-fuel ratio AFT is switched to the second rich setting air-fuel ratio AFTrich2, and the rich process is started. Then, in step S26, the rich flag Fr is set to ON.

When the target air-fuel ratio AFT is set to a rich air-fuel ratio and a lean air-fuel ratio a predetermined number of times, it is determined in step S17 that the end condition for the degradation diagnosis process for the upstream catalyst 20 is met, and the control routine proceeds to step S27. In step S27, an average value ΣOSRave of the oxygen storage/release amount during the rich process and the lean process is calculated. Specifically, in step S27, the integral oxygen storage/release amount ΣOSRup of the upstream catalyst 20 for a period for which each rich process is performed (i.e. for a period since the target air-fuel ratio AFT is set to a rich air-fuel ratio until the target air-fuel ratio AFT is switched to a lean air-fuel ratio) is calculated. This corresponds to an estimated value of the amount of oxygen released from the upstream catalyst 20 during each rich process. In step S27, in addition, the integral oxygen storage/release amount ΣOSRup of the upstream catalyst 20 for a period for which each lean process is performed (i.e. for a period since the target air-fuel ratio AFT is set to a lean air-fuel ratio until the target air-fuel ratio AFT is switched to a rich air-fuel ratio) is calculated. This corresponds to an estimated value of the amount of oxygen stored in the upstream catalyst 20 during each lean process. In step S27, a value obtained by averaging the thus calculated integral oxygen storage/release amount ΣOSRup of the upstream catalyst 20 is calculated as the average value ΣOSRave of the oxygen storage/release amount. This corresponds to an estimated value of the maximum storable oxygen amount Cmax of the upstream catalyst 20.

Then, in step S28, degradation of the upstream catalyst 20 is diagnosed based on the average value ΣOSRave of the oxygen storage/release amount which is calculated in step S27. Specifically, it is determined that the upstream catalyst 20 has been degraded when the average value ΣOSRave of the oxygen storage/release amount of the upstream catalyst 20 is less than a lower limit amount determined in advance. Then, in step S29, the execution flag Fu for the degradation diagnosis process for the upstream catalyst 20 is set to OFF.

In the present embodiment, the lean process and the rich process are performed a plurality of times in the degradation diagnosis process. However, one or both of the lean process and the rich process may be performed only once.

Diagnosis of Degradation of Downstream Catalyst

As discussed above, the exhaust gas control catalysts are degraded because of sintering of the catalytic noble metal etc. when the temperature of the exhaust gas control catalysts becomes high. In general, the downstream catalyst 24 does not become very hot, because an exhaust gas at a high temperature basically does not flow into the downstream catalyst 24. Thus, it is not always necessary to diagnose degradation of the downstream catalyst 24. In the present embodiment, however, the downstream catalyst 24 functions as a particulate filter. Therefore, it is necessary to raise the temperature of the downstream catalyst 24 in order to regularly burn and remove particulate matter deposited on the particulate filter. When the temperature of the downstream catalyst 24 is raised in this manner, the downstream catalyst 24 may also be degraded, and therefore it is necessary to diagnose degradation of the downstream catalyst 24. Therefore, the degradation diagnosis device according to the present embodiment diagnoses degradation of the downstream catalyst 24. Diagnosis of degradation of the downstream catalyst 24 (first degradation diagnosis process) will be described below with reference to FIGS. 6 to 9.

Figure 6:
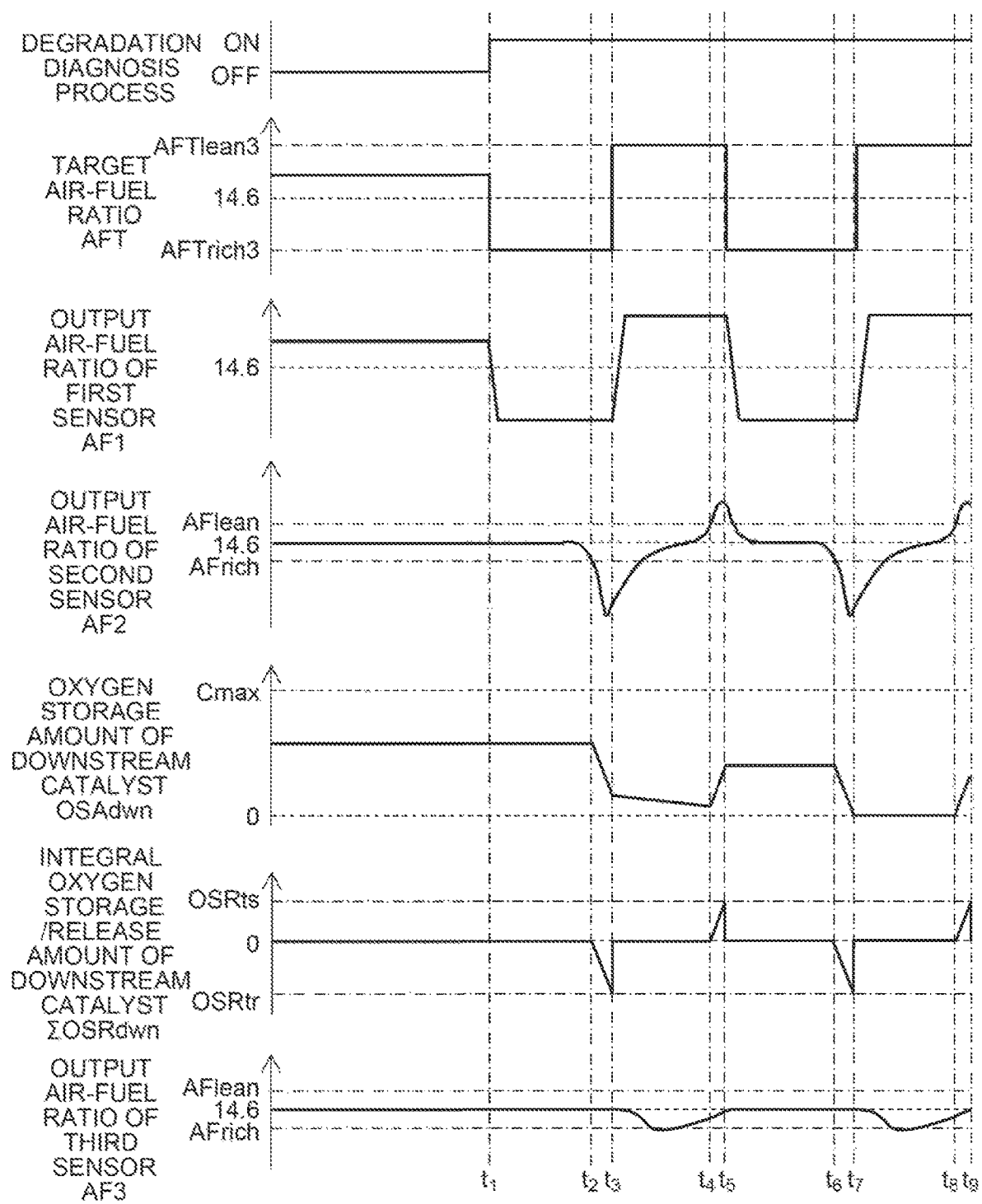
FIG. 6 is a time chart for the target air-fuel ratio etc. for a case where degradation of a downstream catalyst is diagnosed.

FIG. 6 is a time chart for the target air-fuel ratio AFT etc. for a case where degradation of the downstream catalyst 24 is diagnosed. In particular, FIG. 6 indicates a case where the downstream catalyst 24 is not degraded.

In the example indicated in FIG. 6, the normal air-fuel ratio control is performed before time $t_1$. In the example indicated in FIG. 6, in particular, the target air-fuel ratio AFT is set to the first lean setting air-fuel ratio AFTlean1 at this time. Since oxygen in an exhaust gas is stored in the upstream catalyst 20, the output air-fuel ratios of the second air-fuel ratio sensor 42 and the third air-fuel ratio sensor 43 are substantially the stoichiometric air-fuel ratio.

When the degradation diagnosis process for the downstream catalyst 24 is started at time $t_1$, a rich process is executed first. In the present embodiment, the target air-fuel ratio AFT at this time is set to a third rich setting air-fuel ratio AFTrich3 which is lower (higher in the richness degree) than the first rich setting air-fuel ratio AFTrich1. As a result, the air-fuel ratio of an exhaust gas discharged from the engine body 1 is equal to a rich air-fuel ratio, and the oxygen storage amount of the upstream catalyst 20 is gradually decreased, and reaches substantially zero at time $t_2$.

When the oxygen storage amount of the upstream catalyst 20 reaches substantially zero in this manner, the upstream catalyst 20 cannot reduce unburned HC or CO in an exhaust gas that flows into the upstream catalyst 20. Thus, an exhaust gas containing unburned HC and CO, that is, an exhaust gas with a rich air-fuel ratio, flows out of the upstream catalyst 20 after time $t_2$. Therefore, the output air-fuel ratio AF2 of the second air-fuel ratio sensor 42 is equal to a rich air-fuel ratio at time $t_2$. An exhaust gas with a rich air-fuel ratio flows into the downstream catalyst 24 after time $t_2$. As a result, oxygen stored in the downstream catalyst 24 is released and an oxygen storage amount OSAdwn of the downstream catalyst 24 is decreased alter time $t_2$.

In the present embodiment, integration of an oxygen storage/release amount OSRdwn of the downstream catalyst 24 is started at time $t_2$. The oxygen storage/release amount OSRdwn of the downstream catalyst 24 means the amount of oxygen stored in the downstream catalyst 24 from an exhaust gas that flows into the downstream catalyst 24, or the amount of oxygen released from the downstream catalyst 24 into such an exhaust gas. Considering that an exhaust gas with the stoichiometric air-fuel ratio flows into the downstream catalyst 24 during a period from time $t_1$ to time $t_2$, an integral oxygen storage/release amount ΣOSRdwn of the downstream catalyst 24 after the vicinity of time $t_2$ means an estimated value of the amount of oxygen released from the downstream catalyst 24 since the start of the rich process.

In the present embodiment, the oxygen storage/release amount OSRdwn of the downstream catalyst 24 after time $t_2$ is calculated using the following formula (2), for example, as with the oxygen storage/release amount of the upstream catalyst 20. In the following formula (2), AF2 is the output air-fuel ratio of the second air-fuel ratio sensor 42.

$$\text{OSRdwn} = 0.23 \times Qi \times (\text{AF2} - \text{AFR}) \quad (2)$$

The absolute value of the thus calculated integral oxygen storage/release amount ΣOSRdwn of the downstream catalyst 24 after the vicinity of time $t_2$ is gradually increased, and reaches a target oxygen release amount OSRtr determined in advance at time $t_3$. In the present embodiment, the lean process is started when the absolute value of the integral oxygen storage/release amount ΣOSRdwn of the downstream catalyst 24 after time $t_2$ reaches the target oxygen release amount (an example of the first oxygen amount) OSRtr. That is, in the present embodiment, switching is made from the rich process to the lean process when the amount of oxygen released from the downstream catalyst 24 since the rich process is started is equal to the target oxygen release amount OSRtr. The target oxygen release amount OSRtr is set to an amount (e.g. equal to or less than half) that is less than the maximum storable oxygen amount Cmax at the time when the downstream catalyst 24 is brand-new.

In the present embodiment, the target air-fuel ratio AFT during the lean process is set to a third lean setting air-fuel ratio AFTlean3 which is higher (higher in the leanness degree) than the first lean setting air-fuel ratio AFTlean1. In the example indicated in FIG. 6, an exhaust gas with a rich air-fuel ratio flows out of the upstream catalyst 20 also after time $t_3$ when the lean process is started. This is considered that unburned HC and CO in an exhaust gas that flowed into the upstream catalyst 20 during a period from time $t_1$ to time $t_3$ are adsorbed on the upstream catalyst 20 and the adsorbed unburned HC and CO flow out after time t3.

When the lean process is started at time $t_3$, the air-fuel ratio of an exhaust gas discharged from the engine body 1 is equal to a lean air-fuel ratio, and the oxygen storage amount of the upstream catalyst 20 is gradually increased, and reaches substantially the maximum storable oxygen amount at time $t_4$. When the oxygen storage amount of the upstream catalyst 20 reaches substantially the maximum storable oxygen amount in this manner, the upstream catalyst 20 cannot store oxygen in an exhaust gas that flows into the upstream catalyst 20. Thus, an exhaust gas containing oxygen, that is, an exhaust gas with a lean air-fuel ratio, flows out of the upstream catalyst 20 after time $t_4$. Therefore, the output air-fuel ratio AF2 of the second air-fuel ratio sensor 42 is equal to a lean air-fuel ratio at time $t_4$. An exhaust gas with a lean air-fuel ratio flows into the downstream catalyst 24 after time $t_4$. As a result, oxygen is stored in the downstream catalyst 24 and the oxygen storage amount OSAdwn of the downstream catalyst 24 is increased after time $t_4$.

In the present embodiment, integration of the oxygen storage/release amount OSRdwn of the downstream catalyst 24 is started at time $t_4$. Considering that an exhaust gas with an air-fuel ratio that is equal to or less than the stoichiometric air-fuel ratio flows into the downstream catalyst 24 during a period from time $t_3$ to time $t_4$, the integral oxygen storage/release amount ΣOSRdwn of the downstream catalyst 24 after the vicinity of time $t_4$ means an estimated value of the amount of oxygen stored in the downstream catalyst 24 since the start of the lean process.

The absolute value of the thus calculated integral oxygen storage/release amount ΣOSRdwn of the downstream catalyst 24 after the vicinity of time $t_4$ is gradually increased, and reaches a target oxygen storage amount OSRts determined in advance at time $t_5$. In the present embodiment, the target oxygen storage amount OSRts is set to a value that is less than the target oxygen release amount OSRtr. In particular, the target oxygen storage amount OSRts is set to such an amount (e.g. about one-fourth of the maximum storable oxygen amount at the time when the downstream catalyst 24 is brand-new) that it is determined that the downstream catalyst 24 is degraded when the maximum storable oxygen amount becomes less than the amount. In the present embodiment, the rich process is started again, as at time $t_1$, when the absolute value of the integral oxygen storage/release amount ΣOSRdwn of the downstream catalyst 24 after time $t_4$ reaches the target oxygen storage amount (an example of the second oxygen amount) OSRts. That is, in the present embodiment, switching is made from the lean process to the rich process when the amount of oxygen stored in the downstream catalyst 24 since the rich process is started is equal to the target oxygen storage amount OSRts.

After that, the rich process during a period from time $t_1$ to time $t_3$ and the lean process during a period from time $t_3$ to $t_5$ are executed alternately and repeatedly. Thus, a rich process, in which the air-fuel ratio of an exhaust gas that flows into the downstream catalyst 24 is controlled to a rich air-fuel ratio, and a lean process, in which the air-fuel ratio of an exhaust gas that flows into the downstream catalyst 24 is controlled to a lean air-fuel ratio, are performed alternately and repeatedly in the degradation diagnosis process according to the present embodiment.

Figure 7:
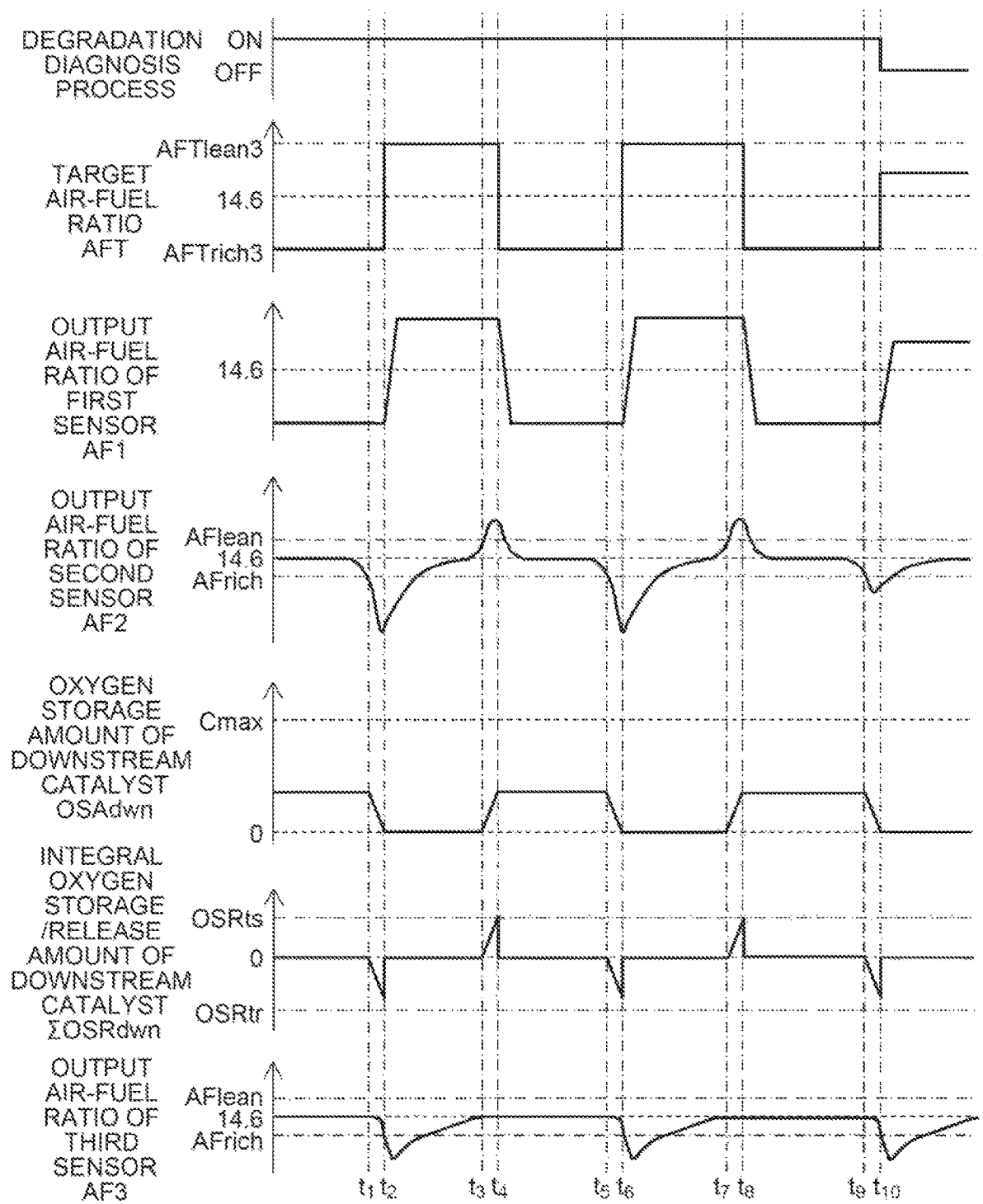
FIG. 7 is a time chart, which is similar to FIG. 6, for a case where degradation of the downstream catalyst is diagnosed.

FIG. 7 is a time chart, which is similar to FIG. 6, for a case where degradation of the downstream catalyst 24 is diagnosed. FIG. 7 also indicates a case where the downstream catalyst 24 is not degraded. In particular, FIG. 7 is a time chart for the time to end the degradation diagnosis process for the downstream catalyst 24.

Also in the example indicated in FIG. 7, as in the example indicated in FIG. 6, when an exhaust gas with a rich air-fuel ratio flows out of the upstream catalyst 20 (at times $t_1$ and $t_5$), the oxygen storage amount OSAdwn of the downstream catalyst 24 is gradually decreased. As discussed above, the target oxygen storage amount (an example of the second oxygen amount) OSRts is less than the target oxygen release amount (an example of the first oxygen amount) OSRtr. Therefore, at time $t_2$ and time $t_5$ in FIG. 7, the oxygen storage amount OSAdwn of the downstream catalyst 24 becomes substantially zero before the absolute value of the integral oxygen storage/release amount ΣOSRdwn of the downstream catalyst 24 reaches the target oxygen release amount OSRtr, and an exhaust gas with a rich air-fuel ratio flows out of the downstream catalyst 24. As a result, as indicated in FIG. 7, the output air-fuel ratio of the third air-fuel ratio sensor 43 is equal to a rich air-fuel ratio (at times $t_2$ and $t_6$). In the present embodiment, switching is made from the rich process to the lean process when the output air-fuel ratio of the third air-fuel ratio sensor 43 is equal to a rich air-fuel ratio in this manner, even before the absolute value of the integral oxygen storage/release amount ΣOSRdwn reaches the target oxygen release amount OSRtr. However, switching may not be made from the rich process to the lean process before the absolute value of the integral oxygen storage/release amount ΣOSRdwn reaches the target oxygen release amount OSRtr, even when the output air-fuel ratio of the third air-fuel ratio sensor 43 is equal to a rich air-fuel ratio in this manner.

In the present embodiment, the degradation diagnosis process is ended when the lean process is performed a predetermined number of times since the start of the degradation diagnosis process. As indicated in FIG. 7, the rich process is executed last when the degradation diagnosis process is to be ended. As a result, the oxygen storage amount OSAdwn of the downstream catalyst 24 is substantially zero after the degradation diagnosis process is ended. Hence, even if an exhaust gas with a lean air-fuel ratio accidentally flows into the downstream catalyst 24 in the normal air-fuel ratio control thereafter, it is possible to suppress an exhaust gas with a lean air-fuel ratio from flowing out of the downstream catalyst 24, and hence to suppress NOx from flowing out of the downstream catalyst 24.

In the present embodiment, as discussed above, the rich process is performed first in the degradation diagnosis process for the downstream catalyst 24. The amount (target oxygen storage amount OSRts) of oxygen stored in the downstream catalyst 24 during the lean process is less than the amount (target oxygen release amount OSRtr) of oxygen released from the downstream catalyst 24 during the lean process. Thus, an exhaust gas with a lean air-fuel ratio does not flow out of the downstream catalyst 24, as indicated in FIGS. 6 and 7, while the maximum storable oxygen amount Cmax of the downstream catalyst 24 is more than the target oxygen storage amount OSRts. Thus, the output air-fuel ratio of the third air-fuel ratio sensor 43 is not equal to a lean air-fuel ratio during the degradation diagnosis process while the maximum storable oxygen amount Cmax of the downstream catalyst 24 is more than the target oxygen storage amount OSRts.

Figure 8:
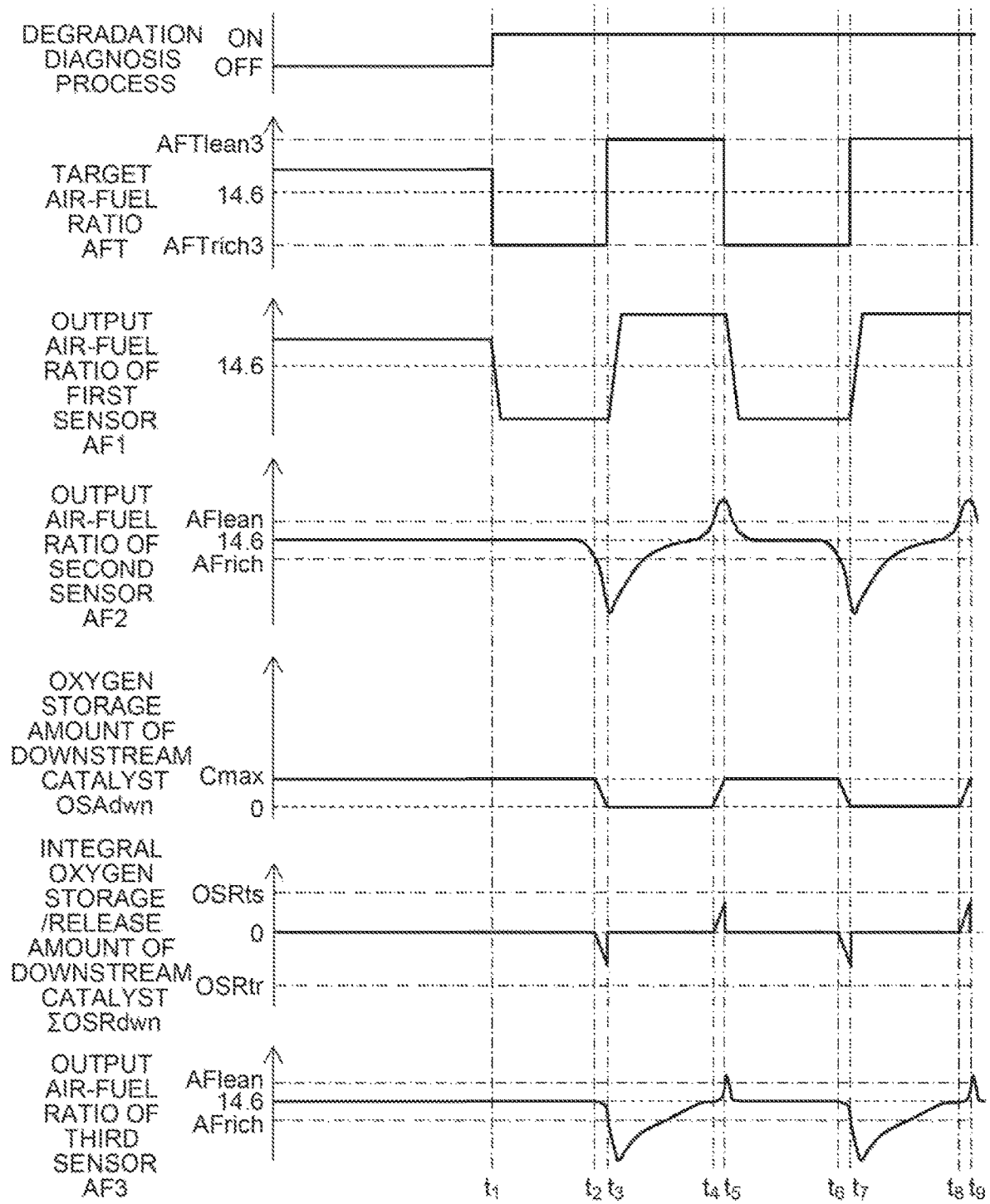
FIG. 8 is a time chart, which is similar to FIG. 6, for a case where degradation of the downstream catalyst is diagnosed.

FIG. 8 is a time chart, which is similar to FIG. 6, for a case where degradation of the downstream catalyst 24 is diagnosed. In particular, FIG. 8 indicates a case where the downstream catalyst 24 is degraded. Thus, in the example indicated in FIG. 8, the maximum storable oxygen amount Cmax of the downstream catalyst 24 is small.

Also in the example indicated in FIG. 8, as in the example indicated in FIG. 6, the normal air-fuel ratio control is performed before time $t_1$. When the degradation diagnosis process for the downstream catalyst 24 is started at time $t_1$, a rich process is executed first, and the target air-fuel ratio AFT is set to the third rich setting air-fuel ratio AFTrich3. As a result, the oxygen storage amount of the upstream catalyst becomes substantially zero at time $t_2$, and an exhaust gas with a rich air-fuel ratio flows into the downstream catalyst 24 after time $t_2$.

When an exhaust gas with a rich air-fuel ratio flows into the downstream catalyst 24, the oxygen storage amount OSAdwn of the downstream catalyst 24 is gradually decreased. Since the maximum storable oxygen amount Cmax of the downstream catalyst 24 is small, the oxygen storage amount OSAdwn of the downstream catalyst 24 becomes substantially zero before the absolute value of the integral oxygen storage/release amount ΣOSRdwn of the downstream catalyst 24 after time $t_2$ reaches the target oxygen release amount OSRtr. As a result, the output air-fuel ratio of the third air-fuel ratio sensor 43 is equal to a rich air-fuel ratio at time $t_3$, before the absolute value of the integral oxygen storage/release amount ΣOSRdwn of the downstream catalyst 24 after time $t_2$ reaches the target oxygen release amount OSRtr. Therefore, switching is made from the rich process to the lean process at time $t_3$.

When the lean process is started at time $t_3$, the target air-fuel ratio AFT is set to the third lean setting air-fuel ratio AFTlean3. As a result, the oxygen storage amount of the upstream catalyst 20 reaches the maximum storable oxygen amount at time $t_4$, and an exhaust gas with a lean air-fuel ratio flows into the downstream catalyst 24 after time $t_4$.

When an exhaust gas with a lean air-fuel ratio flows into the downstream catalyst 24, the oxygen storage amount OSAdwn of the downstream catalyst 24 is gradually increased. Since the maximum storable oxygen amount Cmax of the downstream catalyst 24 is small, the oxygen storage amount OSAdwn of the downstream catalyst 24 becomes substantially the maximum storable oxygen amount Cmax before the absolute value of the integral oxygen storage/release amount ΣOSRdwn of the downstream catalyst 24 after time $t_4$ reaches the target oxygen storage amount OSRts. As a result, the output air-fuel ratio of the third air-fuel ratio sensor 43 is equal to a lean air-fuel ratio at time $t_5$, before the absolute value of the integral oxygen storage/release amount ΣOSRdwn of the downstream catalyst 24 after time $t_4$ reaches the target oxygen storage amount OSRts. In the present embodiment, switching is made from the lean process to the rich process when the output air-fuel ratio of the third air-fuel ratio sensor 43 is equal to a lean air-fuel ratio in this manner, even before the absolute value of the integral oxygen storage/release amount ΣOSRdwn reaches the target oxygen storage amount OSRts. However, switching may not be made from the lean process to the rich process before the absolute value of the integral oxygen storage/release amount ΣOSRdwn reaches the target oxygen storage amount OSRts, even when the output air-fuel ratio of the third air-fuel ratio sensor 43 is equal to a lean air-fuel ratio in this manner.

In this manner, when the downstream catalyst 24 is degraded and the maximum storable oxygen amount Cmax is small, the output air-fuel ratio AF3 of the third air-fuel ratio sensor 43 is equal to a lean air-fuel ratio during the lean process in the degradation diagnosis process for the downstream catalyst 24. Thus, in the present embodiment, it is determined that the downstream catalyst 24 is degraded when the lean process is performed for the degradation diagnosis process for the downstream catalyst 24 and the frequency with which the output air-fuel ratio AF3 of the third air-fuel ratio sensor 43 is equal to a lean air-fuel ratio is equal to or more than a predetermined frequency (e.g. ¾). In the present embodiment, conversely, it is determined that the downstream catalyst 24 is normal, rather than be degraded, when the lean process is performed for the degradation diagnosis process for the downstream catalyst 24 and the frequency with which the output air-fuel ratio AF3 of the third air-fuel ratio sensor 43 is equal to a lean air-fuel ratio is less than the predetermined frequency.

In the embodiment described above, the lean process is executed a plurality of times in the degradation diagnosis process for the downstream catalyst 24. However, the lean process may be performed only once in the degradation diagnosis process for the downstream catalyst 24. In this case, it is determined that the downstream catalyst 24 is degraded when the lean process is performed and the frequency with which the output air-fuel ratio AF3 of the third air-fuel ratio sensor 43 is equal to a lean air-fuel ratio is 1/1.

Figure 9:
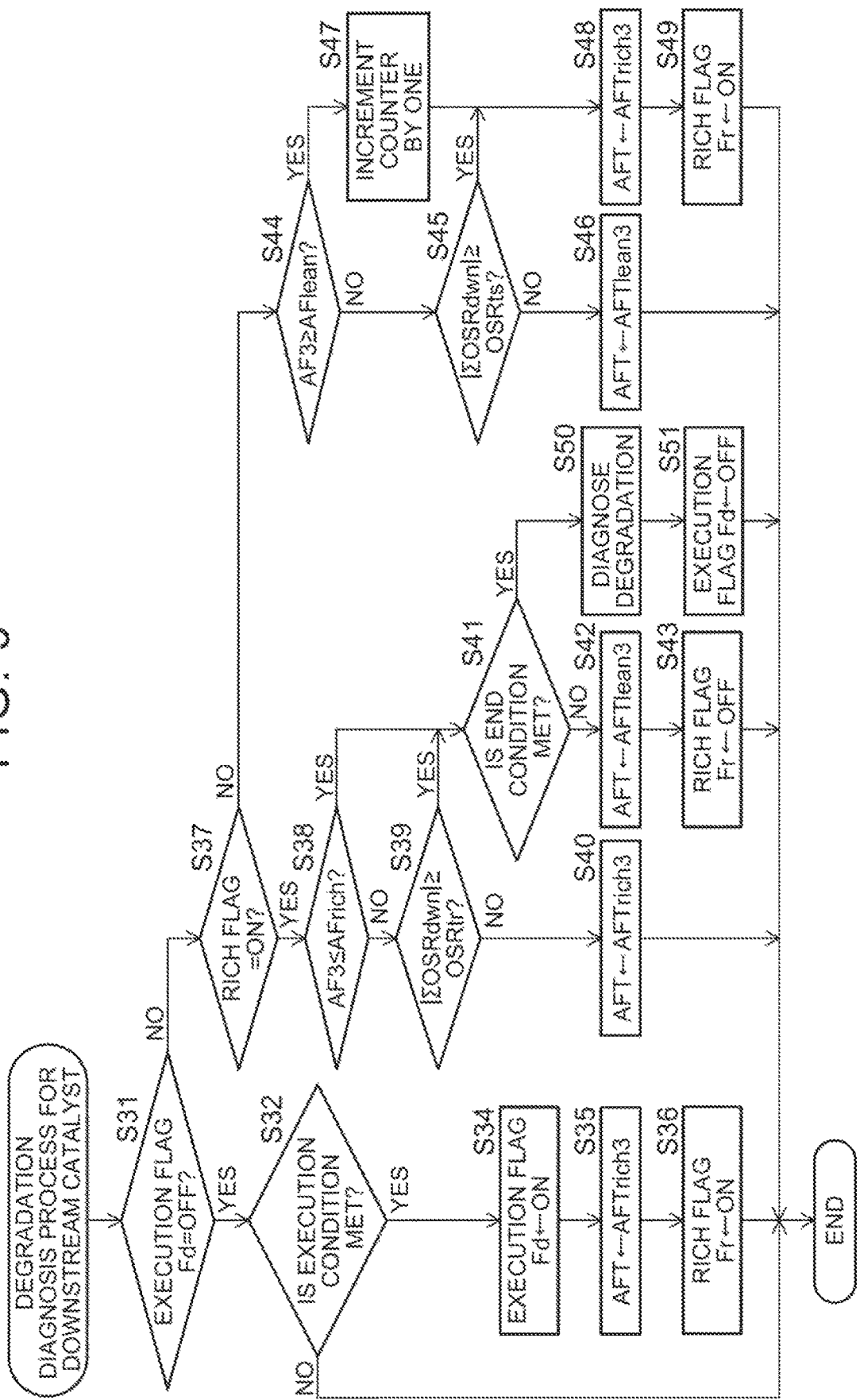
FIG. 9 is a flowchart illustrating a control routine of a setting process for the target air-fuel ratio for a case where a degradation diagnosis process for the downstream catalyst is performed.

FIG. 9 is a flowchart illustrating a control routine of a setting process for the target air-fuel ratio AFT for a case where the degradation diagnosis process for the downstream catalyst 24 is performed. The illustrated control routine is performed by the CPU 35 of the ECU 31 at intervals of a certain time.

First, as illustrated in FIG. 9, it is determined in step S31 whether an execution flag Fd for the degradation diagnosis process for the downstream catalyst 24 is OFF. The execution flag Fd is a flag set to ON when the degradation diagnosis process for the downstream catalyst 24 is executed and set to OFF otherwise. When it is determined in step S31 that the execution flag Fd is set to OFF, the control routine proceeds to step S32.

In step S32, it is determined whether an execution condition for the degradation diagnosis process for the downstream catalyst 24 is met. The execution condition for the degradation diagnosis process for the downstream catalyst 24 is met when the elapsed time or the travel distance since the preceding degradation diagnosis process is equal to or more than a certain value and warm-up of the internal combustion engine has been completed, for example. When it is determined in step S32 that the execution condition for the degradation diagnosis process for the downstream catalyst 24 is not met, the control routine is ended. Thus, the degradation diagnosis process for the downstream catalyst 24 is not executed, and the normal air-fuel ratio control indicated in FIG. 3 is executed, for example.

When it is determined in step S32 that the execution condition for the degradation diagnosis process for the downstream catalyst 24 is met, on the other hand, the control routine proceeds to steps S34 to S36. In steps S34 to S36, the execution flag Fd for the degradation diagnosis process for the downstream catalyst 24 is set to ON, a rich process is started by setting the target air-fuel ratio AFT to the third rich setting air-fuel ratio AFTrich3, and the rich flag Fr is set to ON.

When the execution flag Fd is set to ON in step S34, the next control routine proceeds from step S31 to step S37. In step S37, it is determined whether the rich flag Fr is set to ON. When it is determined in step S37 that the rich flag Fr is set to ON, the control routine proceeds to steps S38 and 39.

In step S38, it is determined whether the output air-fuel ratio AF3 of the third air-fuel ratio sensor 43 is equal to or less than the rich determination air-fuel ratio AFrich, that is, whether the output air-fuel ratio AF3 of the third air-fuel ratio sensor 43 is a rich air-fuel ratio. In step S39, it is determined whether the absolute value of the integral oxygen storage/release amount ΣOSRdwn of the downstream catalyst 24 indicated after the output air-fuel ratio AF2 of the second air-fuel ratio sensor 42 becomes equal to or less than the rich determination air-fuel ratio AFrich, that is, the amount of oxygen released from the downstream catalyst 24 during the lean process, is equal to or more than the target oxygen release amount OSRtr.

The control routine proceeds to step S40 when it is determined in step S38 that the output air-fuel ratio AF3 of the third air-fuel ratio sensor 43 is higher than the rich determination air-fuel ratio AFrich and it is determined in step S39 that the absolute value of the integral oxygen storage/release amount ΣOSRdwn of the downstream catalyst 24 is less than the target oxygen release amount OSRtr.

In step S40, the target air-fuel ratio AFT is kept set to the third rich setting air-fuel ratio AFTrich3, and hence the rich process is continued.

On the other hand, the control routine proceeds to step S41 when it is determined in step S38 that the output air-fuel ratio AF3 of the third air-fuel ratio sensor 43 is equal to or less than the rich determination air-fuel ratio AFrich or it is determined in step S39 that the absolute value of the integral oxygen storage/release amount ΣOSRdwn of the downstream catalyst 24 is equal to or more than the target oxygen release amount OSRtr. In step S41, it is determined whether an end condition for the degradation diagnosis process for the downstream catalyst 24 is met. The end condition for the degradation diagnosis process for the upstream catalyst 20 is met when the lean process is executed a predetermined number of times, or when a lean counter, to be discussed later, has counted to a predetermined reference value, to be discussed later, or more, for example. When it is determined in step S41 that the end condition is not met, the control routine proceeds to step S42. In step S42, the target air-fuel ratio AFT is switched to the third lean setting air-fuel ratio AFTlean3, and the lean process is started. Then, in step S43, the rich flag Fr is set to OFF.

When the rich flag Fr is set to OFF, the next control routine proceeds from step S37 to steps S44 and S45. In step S44, it is determined whether the output air-fuel ratio AF3 of the third air-fuel ratio sensor 43 is equal to or more than the lean determination air-fuel ratio AFlean, that is, whether the output air-fuel ratio AF3 of the third air-fuel ratio sensor 43 is a lean air-fuel ratio. In step S45, it is determined whether the absolute value of the integral oxygen storage/release amount ΣOSRdwn of the downstream catalyst 24 indicated after the output air-fuel ratio AF2 of the second air-fuel ratio sensor 42 becomes equal to or more than the lean determination air-fuel ratio AFlean, that is, the amount of oxygen stored in the downstream catalyst 24 during the lean process, is equal to or more than the target oxygen storage amount OSRts.

The control routine proceeds to step S46 when it is determined in step S44 that the output air-fuel ratio AF3 of the third air-fuel ratio sensor 43 is lower than the lean determination air-fuel ratio AFlean and it is determined in step S45 that the absolute value of the integral oxygen storage/release amount ΣOSRdwn of the downstream catalyst 24 is less than the target oxygen storage amount OSRts. In step S46, the target air-fuel ratio AFT is kept set to the third lean setting air-fuel ratio AFTlean3, and hence the lean process is continued.

On the other hand, the control routine proceeds to step S47 when it is determined in step S44 that the output air-fuel ratio AF3 of the third air-fuel ratio sensor 43 is equal to or more than the lean determination air-fuel ratio AFlean. In step S47, the lean counter is incremented by one, and the control routine proceeds to step S48. The lean counter is a counter that counts the number of times when the output air-fuel ratio AF3 of the third air-fuel ratio sensor 43 is equal to a lean air-fuel ratio during the degradation diagnosis process for the downstream catalyst 24.

When it is determined in step S45 that the absolute value of the integral oxygen storage/release amount ΣOSRdwn of the downstream catalyst 24 is equal to or more than the target oxygen storage amount OSRts, the control routine proceeds to step S48. In step S48, the target air-fuel ratio AFT is switched to the third rich setting air-fuel ratio AFTrich3, and the rich process is started. Then, in step S49, the rich flag Fr is set to ON.

When the lean process is executed a predetermined number of times, for example, it is determined in the subsequent control routine that the end condition is met in step S41, and the control routine proceeds to step S50. In step S50, degradation of the downstream catalyst 24 is diagnosed based on the value of the lean counter. Specifically, it is determined that the downstream catalyst 24 is degraded when the value of the lean counter is equal to or more than a reference value (i.e. when the frequency with which the output air-fuel ratio AF3 of the third air-fuel ratio sensor 43 is equal to a lean air-fuel ratio is equal to or more than a predetermined frequency during the lean process). On the other hand, it is determined that the downstream catalyst 24 is normal when the value of the lean counter is less than the reference value. Then, in step S51, the execution flag Fd for the degradation diagnosis process for the downstream catalyst 24 is set to OFF.

Effects

In the embodiment described above, the target oxygen storage amount OSRts is less than the target oxygen release amount OSRtr. Therefore, with the present embodiment, an exhaust gas with a lean air-fuel ratio does not flow out of the downstream catalyst 24 in performing the degradation diagnosis process for the downstream catalyst 24, unless the downstream catalyst 24 is degraded. Thus, with the present embodiment, it is possible to suppress NOx from flowing out of the downstream catalyst 24 to as little as possible.

In the present embodiment, the rich process is performed first in performing the degradation diagnosis process for the downstream catalyst 24. As a result, it is possible to suppress the oxygen storage amount OSAdwn of the downstream catalyst 24 from reaching the maximum storable oxygen amount Cmax during the degradation diagnosis process, no matter what the oxygen storage amount OSAdwn of the downstream catalyst 24 may be at the start of execution of the degradation diagnosis process, and thus it is possible to suppress NOx from flowing out of the downstream catalyst 24.

In the present embodiment, in addition, the third rich setting air-fuel ratio AFTrich3 during the degradation diagnosis process for the downstream catalyst 24 is lower (higher in the richness degree) than the first rich setting air-fuel ratio AFTrich1 during the normal air-fuel ratio control. As a result, a water gas shift reaction is likely to occur in the upstream catalyst 20 and the downstream catalyst 24 to generate hydrogen. Hydrogen diffuses in an air-fuel ratio sensor faster than unburned HC, CO, etc., and hence the air-fuel ratio sensor is likely to detect a rich air-fuel ratio early. Thus, with the present embodiment, it is possible to detect an exhaust gas with a rich air-fuel ratio from the downstream catalyst 24 early, and hence to suppress unburned HC, CO, etc. from flowing out of the downstream catalyst 24 to as little as possible.

With the present embodiment, the third lean setting air-fuel ratio AFTlean3 during the degradation diagnosis process for the downstream catalyst 24 is higher (higher in the leanness degree) than the first lean setting air-fuel ratio AFTlean1 during the normal air-fuel ratio control. When the degree of leanness of an exhaust gas that flows into the downstream catalyst 24 is low, the degree of leanness of the exhaust gas flowing out of the downstream catalyst 24 is also low. As a result, there is a possibility that the third air-fuel ratio sensor 43 cannot detect an exhaust gas with a lean air-fuel ratio flowing out of the downstream catalyst 24. With the present embodiment, in this respect, the third air-fuel ratio sensor 43 can easily detect an exhaust gas with a lean air-fuel ratio flowing out, since the degree of leanness of the third lean setting air-fuel ratio AFTlean3 is high during the degradation diagnosis process for the downstream catalyst 24.

MODIFICATIONS

While an embodiment of the present disclosure has been described above, the applicable embodiment is not limited to such an embodiment, and may be modified and altered in various ways within the scope of the claims.

For example, the target oxygen storage amount OSRts and the target oxygen release amount OSRtr are each a constant value in the embodiment described above. However, the target oxygen storage amount OSRts and the target oxygen release amount OSRtr may each be a value that is varied in accordance with a parameter related to the maximum storable oxygen amount of an exhaust gas control catalyst.

Figure 10:
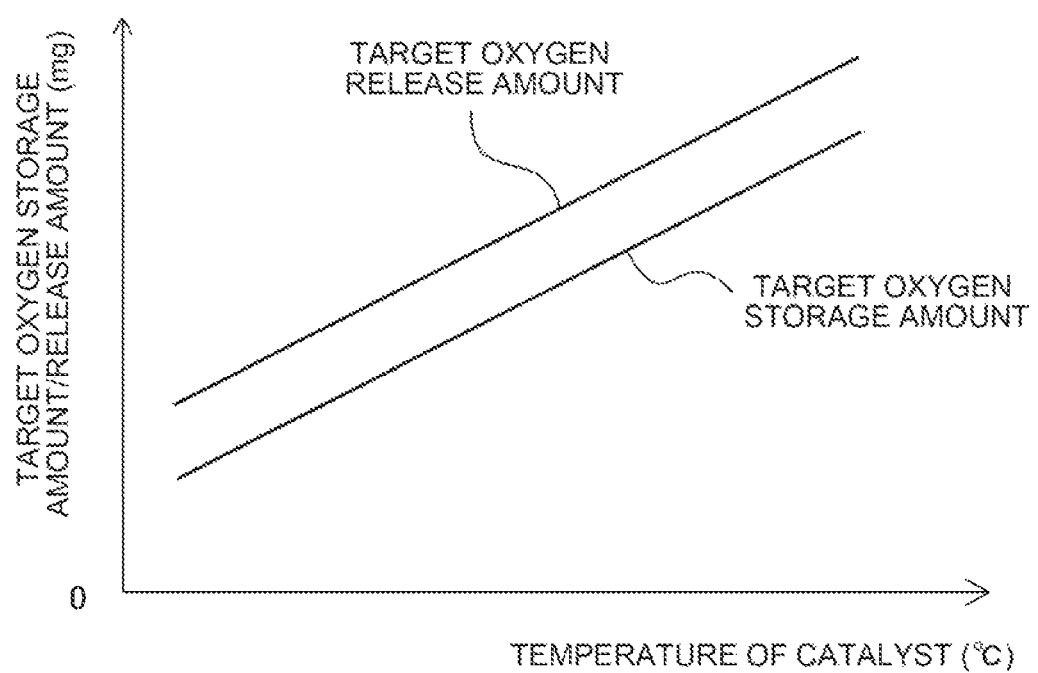
FIG. 10 illustrates the relationship between the temperature of the downstream catalyst and the target oxygen storage amount, and the relationship between temperature of the downstream catalyst and the target oxygen release amount.

For example, the maximum storable oxygen amount of an exhaust gas control catalyst becomes larger as the temperature of the exhaust gas control catalyst becomes higher. Thus, the target oxygen storage amount OSRts and the target oxygen release amount OSRtr may be varied in accordance with the temperature of the exhaust gas control catalyst. FIG. 10 illustrates the relationship between the temperature of the downstream catalyst 24 and the target oxygen storage amount, and the relationship between the temperature of the downstream catalyst 24 and the target oxygen release amount. As indicated in FIG. 10, the target oxygen storage amount is set so as to become larger as the temperature of the downstream catalyst 24 becomes higher. Similarly, the target oxygen release amount is also set so as to become larger as the temperature of the downstream catalyst 24 becomes higher. In this case, the temperature of the downstream catalyst 24 is detected by a temperature sensor (not illustrated) provided in the downstream catalyst 24, for example.

The degradation diagnosis process for the downstream catalyst 24 discussed above may be used to diagnose degradation of the upstream catalyst 20. In this case, an output of the second air-fuel ratio sensor 42 is used in place of an output of the third air-fuel ratio sensor 43.

What is claimed is:

1. A degradation diagnosis device for an exhaust gas control catalyst, the degradation diagnosis device being configured to diagnose degradation of the exhaust gas control catalyst that is provided in an exhaust passage of an internal combustion engine and that is configured to store oxygen, and the degradation diagnosis device comprising:
   a downstream air-fuel ratio sensor configured to detect an air-fuel ratio of an exhaust gas that has flowed out of the exhaust gas control catalyst; and
   a control device configured to control an air-fuel ratio of an exhaust gas that flows into the exhaust gas control catalyst and diagnose degradation of the exhaust gas control catalyst based on an output of the downstream air-fuel ratio sensor, wherein the control device is configured to, in a degradation diagnosis process to diagnose degradation of the exhaust gas control catalyst,
   perform a rich process and a lean process alternately and repeatedly, the rich process being a process in which the air-fuel ratio of the exhaust gas that flows into the exhaust gas control catalyst is controlled to a rich air-fuel ratio that is richer than a stoichiometric air-fuel ratio, and the lean process being a process in which the air-fuel ratio of the exhaust gas that flows into the exhaust gas control catalyst is controlled to a lean air-fuel ratio that is leaner than the stoichiometric air-fuel ratio,
   switch from the rich process to the lean process when an amount of oxygen released from the exhaust gas control catalyst since the rich process is started is equal to a first oxygen amount, and switch from the lean process to the rich process when an amount of oxygen stored in the exhaust gas control catalyst since the lean process is started is equal to a second oxygen amount that is less than the first oxygen amount, and
   determine that the exhaust gas control catalyst has been degraded when the lean process is executed and a frequency with which an output air-fuel ratio of the downstream air-fuel ratio sensor is equal to the lean air-fuel ratio is equal to or more than a predetermined frequency.

2. The degradation diagnosis device according to claim 1, wherein the control device is configured to switch from the rich process to the lean process when the output air-fuel ratio of the downstream air-fuel ratio sensor is equal to the rich air-fuel ratio, even before the amount of oxygen released from the exhaust gas control catalyst since the rich process is started is equal to the first oxygen amount.

3. The degradation diagnosis device according to claim 1, wherein the control device is configured to switch from the lean process to the rich process when the output air-fuel ratio of the downstream air-fuel ratio sensor is equal to the lean air-fuel ratio, even before the amount of oxygen stored in the exhaust gas control catalyst since the lean process is started is equal to the second oxygen amount.

4. The degradation diagnosis device according to claim 1, wherein the control device is configured to execute the rich process first when starting the degradation diagnosis process.

5. The degradation diagnosis device according to claim 1, wherein the control device is configured to execute the rich process last when ending the degradation diagnosis process.

6. The degradation diagnosis device according to claim 1, wherein:
   the control device is configured to control an air-fuel ratio of an exhaust gas discharged from an engine body to be switched between the rich air-fuel ratio and the lean air-fuel ratio alternately in normal air-fuel ratio control that is different from the degradation diagnosis process; and
   the air-fuel ratio of the exhaust gas discharged from the engine body during the rich process is higher in richness degree than that at a time when the air-fuel ratio of the exhaust gas discharged from the engine body is set to the rich air-fuel ratio in the normal air-fuel ratio control.

7. The degradation diagnosis device according to claim 1, wherein:
   the control device is configured to control an air-fuel ratio of an exhaust gas discharged from an engine body to be switched between the rich air-fuel ratio and the lean air-fuel ratio alternately in normal air-fuel ratio control that is different from the degradation diagnosis process; and
   the air-fuel ratio of the exhaust gas discharged from the engine body during the lean process is higher in leanness degree than that at a time when the air-fuel ratio of the exhaust gas discharged from the engine body is set to the lean air-fuel ratio in the normal air-fuel ratio control.

8. The degradation diagnosis device according to claim 1, wherein the first oxygen amount is set so as to become larger as a temperature of the exhaust gas control catalyst becomes higher.

9. The degradation diagnosis device according to claim 1, wherein the second oxygen amount is set so as to become larger as a temperature of the exhaust gas control catalyst becomes higher.

10. The degradation diagnosis device according to claim 1, wherein the exhaust gas control catalyst functions as a particulate filter that traps particulate matter in the exhaust gas.

11. The degradation diagnosis device according to claim 1, further comprising a first air-fuel ratio sensor and a second air-fuel ratio sensor, wherein:
   a first catalyst and a second catalyst are provided in an exhaust passage of the internal combustion engine, the second catalyst serving as the exhaust gas control catalyst and being provided downstream of the first catalyst;
   the first air-fuel ratio sensor is disposed upstream of the first catalyst;
   the second air-fuel ratio sensor is provided between the first catalyst and the second catalyst; and
   a third air-fuel ratio sensor is disposed downstream of the second catalyst, the third air-fuel ratio sensor serving as the downstream air-fuel ratio sensor.

12. The degradation diagnosis device according to claim 11, wherein:
   the control device is configured to execute a second degradation diagnosis process when diagnosing degradation of the first catalyst, the second degradation diagnosis process being different from the degradation diagnosis process;
   the control device is configured to perform the rich process and the lean process alternately and repeatedly also in the second degradation diagnosis process; and
   the control device is configured to, in the second degradation diagnosis process,
      (i) start the lean process by switching an air-fuel ratio of an exhaust gas that flows into the first catalyst from the rich air-fuel ratio to the lean air-fuel ratio when an output air-fuel ratio of the second air-fuel ratio sensor is varied to the rich air-fuel ratio,
      (ii) start the rich process by switching the air-fuel ratio of the exhaust gas that flows into the first catalyst from the lean air-fuel ratio to the rich air-fuel ratio when the output air-fuel ratio of the second air-fuel ratio sensor is varied to the lean air-fuel ratio,
      (iii) estimate an amount of oxygen stored in the first catalyst in one lean process or an amount of oxygen released from the first catalyst in one rich process, and
      (iv) determine based on the estimated amount of oxygen whether the first catalyst has been degraded.

* * * * *

UNITED STATES PATENT AND TRADEMARK OFFICE
CERTIFICATE OF CORRECTION

| | | |
|---|---|---|
| PATENT NO. | : 11,225,896 B1 | Page 1 of 1 |
| APPLICATION NO. | : 17/345443 | |
| DATED | : January 18, 2022 | |
| INVENTOR(S) | : Norihisa Nakagawa | |

It is certified that error appears in the above-identified patent and that said Letters Patent is hereby corrected as shown below:

On the Title Page

Please insert the heading and the following priority information:
--(30) Foreign Application Priority Data
June 26, 2020   (JP)     2020-110493--

Signed and Sealed this
Tenth Day of May, 2022

*Katherine Kelly Vidal*

Katherine Kelly Vidal
*Director of the United States Patent and Trademark Office*